US012597441B2

(12) United States Patent
Enomoto et al.

(10) Patent No.: US 12,597,441 B2
(45) Date of Patent: Apr. 7, 2026

(54) MAGNETIC RECORDING MEDIUM INCLUDING FATTY ESTER AND FATTY ACID ESTER

(71) Applicant: Sony Group Corporation, Tokyo (JP)

(72) Inventors: Taikei Enomoto, Tokyo (JP); Minoru Yamaga, Tokyo (JP); Futoshi Sasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 165 days.

(21) Appl. No.: 18/574,562

(22) PCT Filed: Feb. 22, 2022

(86) PCT No.: PCT/JP2022/007137

§ 371 (c)(1),
(2) Date: Jul. 30, 2024

(87) PCT Pub. No.: WO2023/002657

PCT Pub. Date: Jan. 26, 2023

(65) Prior Publication Data

US 2025/0336418 A1 Oct. 30, 2025

(30) Foreign Application Priority Data

Jul. 21, 2021 (JP) ................................ 2021-0120464

(51) Int. Cl.
*G11B 5/725* (2006.01)
*G11B 5/41* (2006.01)
*G11B 5/78* (2006.01)

(52) U.S. Cl.
CPC ................ *G11B 5/725* (2013.01); *G11B 5/41* (2013.01); *G11B 5/78* (2013.01)

(58) Field of Classification Search
None
See application file for complete search history.

(56) References Cited

U.S. PATENT DOCUMENTS 8,315,017 B2 * 11/2012 Katayama ............ G11B 5/7085 360/134
2001/0008713 A1 * 7/2001 Kato .................. G11B 5/70615
(Continued)

FOREIGN PATENT DOCUMENTS

JP 01196722 A * 8/1989
JP H04184708 A 7/1992
(Continued)

OTHER PUBLICATIONS

Machine Translation of JP 04-184708, published on Jul. 1, 1992 (Year: 1992).*
(Continued)

*Primary Examiner* — William J Klimowicz
(74) *Attorney, Agent, or Firm* — K&L Gates LLP

(57) ABSTRACT

A magnetic recording medium having a high recording density to be capable of preventing an increase in frictional force even in a case where many times of traveling is performed. A magnetic recording medium includes a magnetic layer containing a magnetic powder, the magnetic layer containing first particles having conductivity and second particles having a Mohs hardness of 7 or more, the first and second particles forming protrusions on a surface on a side of the magnetic layer, the second particles forming protrusions having an average height (H2) of 7 nm or less on the surface on the side of the magnetic layer, the magnetic recording medium containing a fatty acid and fatty acid ester, with an extraction rate of the fatty acid of 45% or more, and an extraction rate of the fatty acid ester of 60% or more.

16 Claims, 14 Drawing Sheets

(56) References Cited

U.S. PATENT DOCUMENTS

| | | | | |
|---|---|---|---|---|
| 2003/0157372 | A1* | 8/2003 | Ozawa | G11B 5/7356 |
| 2003/0228493 | A1* | 12/2003 | Doushita | G11B 5/7356 |
| 2009/0027812 | A1* | 1/2009 | Noguchi | G11B 5/70 360/324.11 |
| 2016/0064024 | A1* | 3/2016 | Mikami | G11B 5/7334 428/840.2 |
| 2021/0125634 | A1 | 4/2021 | Yamaga et al. | |
| 2024/0170013 | A1* | 5/2024 | Yamaga | G11B 5/7085 |

FOREIGN PATENT DOCUMENTS

| | | | | | |
|---|---|---|---|---|---|
| JP | 2001006148 | A | * | 1/2001 | |
| JP | 2016051492 | A | | 4/2016 | |
| WO | 2019159465 | A1 | | 8/2019 | |
| WO | WO-2022209316 | A1 | * | 10/2022 | G11B 5/84 |
| WO | WO-2023002723 | A1 | * | 1/2023 | G11B 5/7356 |

OTHER PUBLICATIONS

International Search Report from corresponding PCT application PCT/JP2022/007137, dated May 17, 2022.

* cited by examiner

MAGNETIC RECORDING MEDIUM INCLUDING FATTY ESTER AND FATTY ACID ESTER

TECHNICAL FIELD

The present technology relates to a magnetic recording medium.

BACKGROUND ART

The amount of data collected and stored has been greatly increased, for example, with the development of IoT, big data, artificial intelligence, and the like. A magnetic recording medium is often used as a medium for recording a large amount of data.

Various technologies have been proposed for a magnetic recording medium. For example, as a technology relating to improvement of the traveling stability, Patent Document 1 below discloses a magnetic recording tape including a multilayer structure including at least a magnetic layer, in which the tape has a total thickness of 5.6 μm or less and includes a plurality of recesses disposed in a surface of the magnetic layer, a value obtained by dividing a depth D1 of the plurality of recesses by a thickness D2 of the magnetic layer is 15% or more, the magnetic layer is vertically oriented, a vertical orientation degree under a condition without demagnetizing field correction is 65% or more, a plurality of recesses having a depth of 20% or more of the thickness D2 of the magnetic layer is formed in the magnetic layer, and a number of the plurality of the recesses having a depth of 20% or more of the thickness D2 is 55 or more per 6,400 $\mu m^2$ of a surface area of the magnetic layer.

CITATION LIST

Patent Document

Patent Document 1: WO 2019/159465

SUMMARY OF THE INVENTION

Problems to be Solved by the Invention

In recent years, magnetic tapes (magnetic recording media) have been used for archiving in data centers. As a result, the demand level for reliability of magnetic tapes has been also raised. In particular, it is important that a magnetic tape can stably travel even when the magnetic tape travels many times.

Furthermore, occurrence of an error in reading a servo signal is undesirable while the increase in capacity of magnetic tapes progresses narrowing of width of data tracks. An increase in the frictional force on a magnetic tape due to many times of traveling of the magnetic tape may cause an error in reading a servo signal, and is undesirable for magnetic recording.

Furthermore, if the frictional force on a magnetic tape is high, a stick-slip phenomenon may occur. Occurrence of the phenomenon may cause occurrence of a deviation in traveling speed of the magnetic tape. Furthermore, if the frictional force is high, the tape also moves when the magnetic head is moved in the lateral direction to correct the servo position, and the servo position cannot be immediately corrected.

Furthermore, for example, for cleaning the magnetic head to remove a deposit attached to the magnetic head, improvement in the polishing force of the magnetic tape is awaited. Many times of traveling of the magnetic tape may also cause a reduction in the polishing force of the magnetic tape on the magnetic head.

In order to prevent an increase in frictional force during traveling of a magnetic tape, for example, it is conceivable to use a solid lubricant component (such as carbon particles having a function as the solid lubricant, or the like). Furthermore, for cleaning the magnetic head, it is conceivable to use a component having a polishing effect (furthermore, an anchor effect) (such as particles having a high Mohs hardness, in particular, alumina, or the like). It is conceivable to make a magnetic tape (for example, magnetic layer) include combination of these two components to prevent an increase in frictional force and clean the magnetic head.

However, if the polishing force becomes too high, the magnetic head itself may be damaged, or the amount of heat or electric charge generated by friction may increase, so that damage to the magnetic head may increase.

A main object of the present technology is to provide a magnetic recording medium having a high recording density to be capable of preventing an increase in frictional force even in a case where many times of traveling is performed. Furthermore, an object of the present technology is to provide a magnetic recording medium capable of, in addition to the prevention of an increase in frictional force, alleviating damage to a magnetic head by releasing a fatty acid or a fatty acid ester efficiently to a surface while maintaining a polishing force at the time of many times of traveling.

SOLUTIONS TO PROBLEMS

The present technology provides a magnetic recording medium including a magnetic layer containing a magnetic powder, the magnetic layer containing first particles having conductivity and second particles having a Mohs hardness of 7 or more, the first particles and the second particles forming protrusions on a surface on a side of the magnetic layer, the second particles forming protrusions having an average height (H2) of 7 nm or less on the surface on the side of the magnetic layer, the magnetic recording medium containing a fatty acid, the magnetic recording medium having an extraction rate of the fatty acid of 45% or more, the extraction rate defined by a formula described below.

$$\text{Extraction rate of fatty acid (\%)}=[\text{amount of fatty acid extracted in 5 minutes (mg/m}^2\text{)/total amount of fatty acid extracted (mg/m}^2\text{)}]\times 100$$

The amount of the fatty acid extracted in 5 minutes ($mg/m^2$) can be 3.0 $mg/m^2$ or more.

The total amount of the fatty acid extracted ($mg/m^2$) can be 5.0 $mg/m^2$ or more.

The fatty acid can include stearic acid.

The magnetic recording medium can further contain a fatty acid ester, and have an extraction rate of the fatty acid ester of 60% or more, and the extraction rate is defined by a formula described below.

$$\text{Extraction rate of fatty acid ester (\%)}=[\text{amount of fatty acid ester extracted in 5 minutes (mg/m}^2\text{)/total amount of fatty acid ester extracted (mg/m}^2\text{)}]\times 100$$

The amount of the fatty acid ester extracted in 5 minutes ($mg/m^2$) can be 10.0 $mg/m^2$ or more.

The total amount of the fatty acid ester extracted ($mg/m^2$) can be 12.0 $mg/m^2$ or more.

The fatty acid ester can include butyl stearate.

The magnetic layer can have an average thickness of 0.08 μm or less.

The magnetic recording medium can further include a non-magnetic layer.

The non-magnetic layer can have an average thickness of 1.2 μm or less.

The average thickness (average total thickness) can be 5.7 μm or less.

The magnetic powder can have a surface covered with a covering agent.

The covering agent can include an organic acid.

The second particles can include inorganic particles.

The second particles can include alumina particles.

The present technology provides a magnetic recording cartridge including the magnetic recording medium in a state of being wound around a reel, the magnetic recording medium accommodated in a case.

MODE FOR CARRYING OUT THE INVENTION

Figure 1:
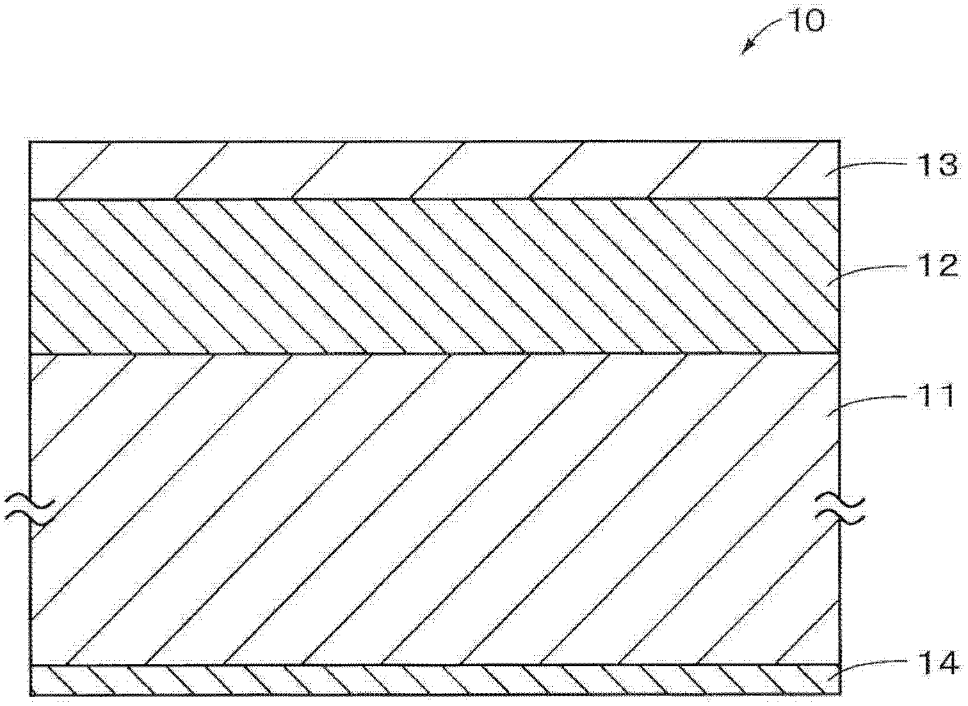
FIG. 1 is a cross-sectional view illustrating a configuration of a magnetic recording medium according to a first embodiment.

Hereinafter, preferred modes for implementing the present technology will be described. Note that embodiments described below illustrate representative embodiments of the present technology, and the scope of the present technology is not limited only to these embodiments.

The present technology will be described in the following order.

1. Description of Present Technology
2. First Embodiment
(1) Configuration of Magnetic Recording Medium
(2) Description of Each Layer
(3) Physical Properties and Structure
(4) Method of Manufacturing Magnetic Recording Medium
(5) Recording and Reproducing Apparatus
(6) Modified Examples
3. Second Embodiment (Cartridge)
(1) Embodiment of Magnetic Recording Cartridge
(2) Modified Example of Magnetic Recording Cartridge
4. Examples In the present description, in a case where a measurement method is described without a particular description of the measurement environment, the measurement is performed under an environment of 25° C.+2° C. and 50% RH±5% RH.

1. DESCRIPTION OF PRESENT TECHNOLOGY

The present inventors have found that an increase in frictional force can be prevented by adjusting the extraction rate of a fatty acid or a fatty acid ester contained as a lubricant described below in a magnetic recording medium and adjusting the heights of protrusions formed by second particles.

That is, the magnetic recording medium according to the present technology includes a magnetic layer containing a magnetic powder, and the magnetic layer contains first particles having conductivity and second particles having a Mohs hardness of 7 or more. The first particles have conductivity, and may have a function as a solid lubricant. Furthermore, the second particles have a Mohs hardness of 7 or more and preferably 9 or more, and can have a polishing effect and an anchor effect. Protrusions are formed by the first particles and the second particles on the magnetic layer side surface. A method of measuring the average height ($H_2$) of the protrusions of the second particles will be described in 2. (3) below.

In the magnetic recording medium according to the present technology, the average height ($H_2$) of the protrusions formed by the second particles can be 7 nm or less, preferably 6.5 nm or less, more preferably 6.0 nm or less, still more preferably 5.5 nm or less, and still even more preferably 5.3 nm or less. If the magnetic recording medium has an average height ($H_2$) of the protrusions formed by the second particles within the above numerical range, a friction increase due to many times of traveling is less likely to occur, resulting in contribution to enabling appropriate maintenance of the polishing force on the magnetic head.

Furthermore, the lower limit of the average height ($H_2$) of the protrusions formed by the second particles is not particularly limited, and can be, for example, preferably 2.0 nm or more, more preferably 2.5 nm or more, and still more preferably 3.0 nm or more.

As the magnetic recording medium travels, a deposit adheres to the magnetic head. For removing such a magnetic head deposit, the heights of the protrusions formed by the second particles are adjusted as described above, and thus the cleaning force (polishing force) on the magnetic head can be improved. However, if the cleaning force (polishing force) on the magnetic head is improved, the magnetic head itself may be polished and damaged, and thus the output may decrease.

The magnetic recording medium according to the present technology contains a fatty acid. Furthermore, the magnetic recording medium according to the present technology may further contain a fatty acid ester. Such fatty acid or fatty acid ester exudes to the surface of the magnetic recording medium and covers the surface of the second particles, and thus damage to the magnetic head can be reduced.

The fatty acid or the fatty acid ester is contained in a non-magnetic layer (underlayer) and the magnetic layer. Normally, fatty acid is captured in a magnetic powder or a non-magnetic powder, and little amount of fatty acid can exude to the surface of a magnetic recording medium.

In the present technology, the extraction rate of the fatty acid or the fatty acid ester is used as an index of ease of exudation of the fatty acid or the fatty acid ester from the surface of the magnetic recording medium. That is, a large value of the extraction rate means that the degree of capture of the fatty acid or the fatty acid ester in the magnetic powder or the like is small and thus the fatty acid or the fatty acid ester easily exude, and a small extraction rate means that the degree of capture of the fatty acid or the fatty acid ester in the magnetic powder or the like is large and thus the fatty acid or the fatty acid ester is less likely to exude.

In the present technology, in order to improve the extraction rate of the fatty acid or the fatty acid ester, for example, the following methods may be used.

(1) Method of suppressing capture of fatty acid in magnetic powder or non-magnetic powder using covering agent (i) A method of covering the surface of a magnetic powder or the surface of a non-magnetic powder using, as a covering agent, an agent that functions as an acid group, such as an organic acid having one or more polar groups, for example, a carboxylic acid, a phosphonic acid, a sulfonic acid, or the like, its metal salt, or the like.

(ii) A method of covering the surface of a magnetic powder or the surface of a non-magnetic powder using a coupling agent (silane, aluminum, titanium, or the like) as a covering agent.

(iii) A method in which carbon, a metal oxide, or a hydroxide (of aluminum, yttrium, or the like) is used as a covering agent and adhered to the surface of a magnetic powder or the surface of a non-magnetic powder to reduce the surface activity.

(2) Method of changing film structure such as thickness of magnetic layer, thickness of non-magnetic layer, or void to facilitate exudation of fatty acid ester A method of adjusting the thickness of the magnetic layer, the thickness of the non-magnetic layer, the amount of a curing agent, conditions of calender processing (temperature, pressure, and the like), and the amount of a binder (P/B ratio) in the non-magnetic layer.

In the present technology, the extraction rate of the fatty acid defined by the following formula can be 45% or more, preferably 50% or more, more preferably 55% or more, and still more preferably 60% or more. If the extraction rate of the fatty acid is less than 45%, the friction increases, the magnetic head deteriorates due to the frictional heat and the electro static charge, damage to the coating film also increases, the amount of the fallen powder increases, and in addition, the durability deteriorates.

$$\text{Extraction rate of fatty acid (\%)}=[\text{amount of fatty acid extracted in 5 minutes (mg/m}^2\text{)/total amount of fatty acid extracted (mg/m}^2\text{)}]\times 100$$

Furthermore, the upper limit of the extraction rate of the fatty acid is not particularly limited, and can be preferably 75% or less, more preferably 73% or less, and still more preferably 70% or less from the viewpoint of suppressing plasticization of the coating film itself, an increase in the amount of the fallen powder, and deterioration of the durability. A method of measuring the extraction rate of the fatty acid will be described in 2. (3) below.

Furthermore, the amount of the fatty acid extracted in 5 minutes (mg/m$^2$) can be preferably 3.0 mg/m$^2$ or more, more preferably 3.5 mg/m$^2$ or more, still more preferably 4.0 mg/m$^2$ or more, and still even more preferably 4.5 mg/m$^2$ or more.

Furthermore, the upper limit of the amount of the fatty acid extracted in 5 minutes is not particularly limited, and can be preferably 14.0 mg/m$^2$ or less, more preferably 13.0 mg/m$^2$ or less, still more preferably 12.0 mg/m$^2$ or less, and still even more preferably 10.0 mg/m$^2$ or less. A method of measuring the amount of the fatty acid extracted in 5 minutes will be described in 2. (3) below.

Furthermore, the total amount of the fatty acid extracted (mg/m$^2$) can be preferably 5.0 mg/m$^2$ or more, more preferably 7.0 mg/m$^2$ or more, still more preferably 9.0 mg/m$^2$ or more, and still even more preferably 10.0 mg/m$^2$ or more.

Furthermore, the upper limit of the total amount of the fatty acid extracted is not particularly limited, and can be preferably 16.0 mg/m$^2$ or less, more preferably 15.0 mg/m$^2$ or less, still more preferably 14.0 mg/m$^2$ or less, and still even more preferably 13.0 mg/m$^2$ or less. A method of measuring the total amount of the fatty acid extracted will be described in 2. (3) below.

The magnetic recording medium according to the present technology further contains a fatty acid ester, and the extraction rate of the fatty acid ester defined by the following formula can be preferably 60% or more, more preferably 65% or more, still more preferably 70% or more, and still even more preferably 75% or more from the viewpoint of suppressing an increase in the friction, deterioration of the magnetic head due to the frictional heat and the electro static charge, an increase in damage to the coating film, an increase in the amount of the fallen powder, and in addition, deterioration of the durability.

$$\text{Extraction rate of fatty acid ester (\%)}=[\text{amount of fatty acid ester extracted in 5 minutes (mg/m}^2\text{)/total amount of fatty acid ester extracted (mg/m}^2\text{)}]\times 100$$

Furthermore, the upper limit of the extraction rate of the fatty acid ester is not particularly limited, and can be preferably 90% or less, more preferably 85% or less, and still more preferably 80% or less from the viewpoint of suppressing plasticization of the coating film itself, an increase in the amount of the fallen powder, and deterioration of the durability. A method of measuring the extraction rate of the fatty acid ester will be described in 2. (3) below.

Furthermore, the amount of the fatty acid ester extracted in 5 minutes (mg/m$^2$) can be preferably 10.0 mg/m$^2$ or more, more preferably 12.0 mg/m$^2$ or more, still more preferably 14.0 mg/m$^2$ or more, and still even more preferably 16.0 mg/m$^2$ or more.

Furthermore, the upper limit of the amount of the fatty acid ester extracted in 5 minutes is not particularly limited, but if the upper limit is more than 25.0 mg/m$^2$, plasticization of the coating film may proceed to worsen the state of falling-off of the powder, and therefore the upper limit can be preferably 20.0 mg/m$^2$ or less, more preferably 19.0 mg/m$^2$ or less, still more preferably 18.0 mg/m$^2$ or less, and still even more preferably 17.0 mg/m$^2$ or less. A method of measuring the amount of the fatty acid ester extracted in 5 minutes will be described in 2. (3) below.

Furthermore, the total amount of the fatty acid ester extracted (mg/m$^2$) can be preferably 12.0 mg/m$^2$ or more, more preferably 14.0 mg/m$^2$ or more, still more preferably 16.0 mg/m$^2$ or more, and still even more preferably 19.0 mg/m$^2$ or more.

Furthermore, the upper limit of the total amount of the fatty acid ester extracted is not particularly limited, and can be preferably 25.0 mg/m$^2$ or less, more preferably 24.0 mg/m$^2$ or less, still more preferably 23.0 mg/m$^2$ or less, and still even more preferably 22.0 mg/m$^2$ or less. A method of measuring the total amount of the fatty acid ester extracted will be described in 2. (3) below.

The magnetic recording medium according to the present technology is preferably an elongated magnetic recording medium, and can be, for example, a magnetic recording tape (particularly an elongated magnetic recording tape).

The magnetic recording medium according to the present technology may include a magnetic layer, a non-magnetic layer (underlayer), a base layer, and a back layer in this order, and may include other layers in addition to these layers. The other layers may be appropriately selected according to the type of the magnetic recording medium. The magnetic recording medium is a coating type magnetic recording medium. For the layers included in the magnetic recording medium other than the four layers described above, these descriptions may be referred to.

The average thickness (average total thickness) $t_T$ of the magnetic recording medium according to the present technology may be, for example, preferably 5.7 μm or less, 5.6 μm or less, 5.5 μm or less, 5.4 μm or less, or 5.3 μm or less, more preferably 5.2 μm or less, 5.0 μm or less, still more preferably 4.6 μm or less, and still even more preferably or 4.4 μm or less. Since the magnetic recording medium may be thin as described above, for example, the length of the tape wound in one magnetic recording cartridge can be made longer, and therefore, the recording capacity per magnetic recording cartridge can be increased. The lower limit of the average thickness (average total thickness) $t_T$ of the magnetic recording medium is not particularly limited, and is, for example, 3.5 μm≤$t_T$.

The average thickness $t_m$ of the magnetic layer of the magnetic recording medium according to the present technology can be preferably 0.08 μm or less, more preferably 0.07 μm or less, still more preferably 0.06 μm or less or 0.05 μm or less, and still even more preferably 0.04 μm or less. The lower limit of the average thickness $t_m$ of the magnetic layer is not particularly limited, and can be preferably 0.03 μm or more. A method of measuring the average thickness of the magnetic layer will be described in 2. (3) below.

The average thickness of the non-magnetic layer (average thickness of the underlayer) of the magnetic recording medium according to the present technology can be preferably 1.2 μm or less, more preferably 1.0 μm or less, 0.9 μm or less, 0.8 μm or less, or 0.7 μm or less, and still more preferably 0.6 μm or less. Furthermore, the lower limit of the average thickness of the non-magnetic layer is not particularly limited, and can be preferably 0.2 μm or more, and more preferably 0.3 μm or more. A method of measuring the average thickness of the non-magnetic layer will be described in 2. (3) below.

The average thickness of the base layer of the magnetic recording medium according to the present technology can be preferably 4.5 μm or less, more preferably 4.2 μm or less, 4.0 μm or less, or 3.6 μm or less, and still more preferably 3.0 μm or less. A method of measuring the average thickness of the base layer will be described in 2. (3) below.

The average thickness of the back layer of the magnetic recording medium according to the present technology can be preferably 0.6 μm or less, more preferably 0.5 μm or less, and still more preferably 0.4 μm or less, 0.3 μm or less, or 0.25 μm or less. A method of measuring the average thickness of the back layer will be described in 2. (3) below.

The average particle volume of the magnetic powder contained in the magnetic recording medium of the present technology can be 2600 nm$^3$ or less, preferably 2000 nm$^3$ or less, and more preferably 1600 nm$^3$ or less. If the average particle volume is within the above numerical range, an electromagnetic conversion characteristic is improved. Although the magnetic recording medium of the present technology contains the magnetic powder having such an extremely small average particle volume, the magnetic recording medium of the present technology is excellent in thermal stability as described above. Although both an electromagnetic conversion characteristic and thermal stability are difficult to achieve, the present technology can improve both an electromagnetic conversion characteristic and thermal stability. The average particle volume of the magnetic powder may be, for example, 500 nm$^3$ or more, and particularly 700 nm$^3$ or more. A method of measuring the average particle volume of the magnetic powder will be described in 2. (3) below.

In the present technology, the squareness ratio in the vertical direction can be preferably 65% or more, more preferably 67% or more, and still more preferably 70% or more. If the squareness ratio is within the above numerical range, the vertical orientation of the magnetic powder is sufficiently high, so that a more excellent cNR can be obtained. Therefore, a more excellent electromagnetic conversion characteristic can be obtained. A method of measuring the squareness ratio in the vertical direction will be described in 2. (3) below.

The magnetic recording medium according to the present technology can have, for example, at least one data band and at least two servo bands. The number of data bands can be, for example, 2 to 10, particularly 3 to 6, and more particularly 4 or 5. The number of servo bands can be, for example, 3 to 11, particularly 4 to 7, and more particularly 5 or 6. These servo bands and data bands may be arranged, for example, so as to extend in the longitudinal direction of the elongated magnetic recording medium (particularly, magnetic recording tape), and in particular, so as to be substantially parallel. The data bands and the servo bands can be provided in the magnetic layer. Examples of the magnetic recording medium having the data bands and the servo bands as described above include a magnetic recording tape conforming to the Linear Tape-Open (LTO) standard. That is, the magnetic recording medium according to the present technology may be a magnetic recording tape conforming to the LTO standard. For example, the magnetic recording medium according to the present technology may be a magnetic recording tape conforming to LTO8 or a later standard (for example, LTO9, LTO10, LTO11, LTO12, or the like).

The width of the elongated magnetic recording medium (particularly, magnetic recording tape) according to the present technology can be, for example, 5 mm to 30 mm, particularly 7 mm to 25 mm, more particularly 10 mm to 20 mm, and still more particularly 11 mm to 19 mm. The length of the elongated magnetic recording medium (particularly, magnetic recording tape) can be, for example, 500 m to 1500 m. For example, the tape width conforming to the LTO8 standard is 12.65 mm, and the length is 960 m.

2. First Embodiment

(1) Configuration of Magnetic Recording Medium

First, a configuration of a magnetic recording medium 10 according to a first embodiment will be described with reference to FIG. 1. The magnetic recording medium 10 is, for example, a magnetic recording medium subjected to vertical orientation processing, and includes an elongated base layer (also referred to as a substrate) 11, a non-magnetic layer (also referred to as an underlayer) 12 provided on one principal plane of the base layer 11, a magnetic layer (also referred to as a recording layer) 13 provided on the non-magnetic layer 12, and a back layer 14 provided on the other principal plane of the base layer 11, as illustrated in FIG. 1. Hereinafter, among both the principal planes of the magnetic recording medium 10, the plane on which the magnetic layer 13 is provided will be referred to as a magnetic surface, and the plane opposite from the magnetic surface (the plane on which the back layer 14 is provided) will be referred to as a back surface.

The magnetic recording medium 10 has an elongated shape and travels in the longitudinal direction during recording and reproducing. Furthermore, the magnetic recording medium 10 may be configured to be capable of recording a signal at the shortest recording wavelength of preferably 100 nm or less, more preferably 75 nm or less, still more preferably 60 nm or less, and particularly preferably 50 nm or less, and can be used, for example, in a recording and reproducing apparatus whose shortest recording wavelength is in the above-described range. The recording and reproducing apparatus may include a ring type head as a recording head. The recording track width is, for example, 2 μm or less.

(2) Description of Each Layer (Base Layer)

The base layer 11 can function as a support of the magnetic recording medium 10, and is, for example, an elongated flexible non-magnetic substrate, and particularly, can be a non-magnetic film. The average thickness of the base layer 11 can be, for example, preferably 4.5 μm or less, more preferably 4.2 μm or less, 4.0 μm or less, or 3.6 μm or less, and still more preferably 3.0 μm or less. Note that the lower limit of the average thickness of the base layer 11 may be determined, for example, from the viewpoint of a limit of film formation, a function of the base layer 11, or the like. The base layer 11 can contain, for example, at least one of a polyester-based resin, a polyolefin-based resin, a cellulose derivative, a vinyl-based resin, an aromatic polyether ketone resin, or other polymer resins. In a case where the base layer 11 contains two or more of the above-described materials, the two or more materials may be mixed, copolymerized, or layered.

The polyester-based resin may be, for example, one or a mixture of two or more of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycarboxylate. According to a preferred embodiment of the present technology, the base layer 11 may include PET or PEN.

The polyolefin-based resin may be, for example, one or a mixture of two or more of polyethylene (PE) and polypropylene (PP).

The cellulose derivative may be, for example, one or a mixture of two or more of cellulose diacetate, cellulose triacetate, cellulose acetate butyrate (CAB), and cellulose acetate propionate (CAP).

The vinyl-based resin may be, for example, one or a mixture of two or more of polyvinyl chloride (PVC) and polyvinylidene chloride (PVDC).

The aromatic polyether ketone resin may be, for example, one or a mixture of two or more of polyether ketone (PEK), polyether ether ketone (PEEK), polyether ketone ketone (PEKK), and polyether ether ketone ketone (PEEKK). According to a preferred embodiment of the present technology, the base layer 11 may include PEEK.

The other polymer resins may be, for example, one or a mixture of two or more of a polyamide, nylon (PA), an aromatic polyamide, aramid (aromatic PA), a polyimide (PI), an aromatic polyimide (aromatic PI), a polyamideimide (PAI), an aromatic polyamideimide (aromatic PAI), polybenzoxazole such as Zylon (registered trademark) (PBO), a polyether, a polyether ester, polyether sulfone (PES), polyether imide (PEI), polysulfone (PSF), polyphenylene sulfide (PPS), polycarbonate (PC), polyarylate (PAR), and a polyurethane (PU).

(Magnetic Layer)

The magnetic layer 13 can be, for example, a perpendicular recording layer. The magnetic layer 13 contains a magnetic powder. The magnetic layer 13 contains first particles having conductivity and second particles having a Mohs hardness of 7 or more, in addition to the magnetic powder. Furthermore, the magnetic layer 13 can further contain, for example, a binder. The magnetic layer 13 may further contain, for example, an additive such as a lubricant, a corrosion inhibitor, or the like, as needed.

The average thickness $t_m$ of the magnetic layer 13 can be preferably 0.08 μm or less, more preferably 0.07 μm or less, and still more preferably 0.06 μm or less, 0.05 μm or less, or 0.04 μm or less. The lower limit of the average thickness $t_m$ of the magnetic layer 13 is not particularly limited, and can be preferably 0.03 μm or more. The average thickness $t_m$ of the magnetic layer 13 within the above numerical range contributes to improvement in an electromagnetic conversion characteristic.

The magnetic layer 13 is preferably a vertically oriented magnetic layer. In the present description, the word "vertical orientation" indicates that the squareness ratio Si measured in the longitudinal direction (traveling direction) of the magnetic recording medium 10 is 35% or less.

Note that the magnetic layer 13 may be an in-plane oriented (longitudinally oriented) magnetic layer. That is, the magnetic recording medium 10 may be a horizontal recording type magnetic recording medium. However, vertical orientation is more preferable in terms of a higher recording density.

(Magnetic Powder)

Examples of the magnetic particles forming the magnetic powder contained in the magnetic layer 13 can include epsilon type iron oxide (ε-iron oxide), gamma hematite, magnetite, chromium dioxide, cobalt-coated iron oxide, hexagonal ferrite, barium ferrite (BaFe), Co ferrite, strontium ferrite, a metal, and the like, but are not limited thereto. The magnetic powder may be one or a combination of two or more thereof. Particularly preferably, the magnetic powder can include ε-iron oxide magnetic powder, barium ferrite magnetic powder, cobalt ferrite magnetic powder, or strontium ferrite magnetic powder. Note that ε-iron oxide may contain Ga and/or Al. These magnetic particles may be appropriately selected by those skilled in the art on the basis of factors such as the method of manufacturing the magnetic layer 13, a specification of the tape, a function of the tape, and the like.

The average particle size (average maximum particle size) D of the magnetic powder can be preferably 22 nm or less, more preferably 8 nm or more and 22 nm or less, and still more preferably 10 nm or more and 20 nm or less.

The average particle size D of the magnetic powder is determined as follows. First, the magnetic recording medium 10 to be measured is processed with a focused ion beam (FIB) method or the like to prepare a thin piece, and a cross-section of the thin piece is observed with a transmission electron microscope (TEM). Next, 500 ε-iron oxide particles are randomly selected from the imaged TEM photo, the maximum particle size $d_{max}$ of each particle is measured, and the particle size distribution of the maximum particle size $d_{max}$ of the magnetic powder is obtained. Here, the "maximum particle size $d_{max}$" means a so-called maximum Feret diameter, and specifically, refers to the largest one of the distances between two parallel lines drawn from all angles so as to be in contact with the outline of an ε-iron oxide particle. Thereafter, the median diameter (50% diameter, D50) of the maximum particle size $d_{max}$ is determined from the particle size distribution of the determined maximum particle size $d_{max}$, and is regarded as the average particle size (average maximum particle size) D of the magnetic powder.

The shape of the magnetic powder is preferably at least one of a plate shape, a spherical shape, and a square shape. The shape of the magnetic powder depends on a crystal structure of the magnetic particles. Examples of the magnetic powder having a plate shape include BaFe and strontium ferrite having a hexagonal plate shape. Examples of the magnetic powder having a spherical shape include ε-iron oxide. Examples of the magnetic powder having a square shape include cobalt ferrite having a cubic shape. These magnetic particles are oriented in a manufacturing process of the magnetic recording medium 10.

According to a preferred embodiment of the present technology, the magnetic powder can preferably include a powder of nanoparticles containing ε-iron oxide (hereinafter, referred to as "ε-iron oxide particles"). Even if fine particles, the ε-iron oxide particles can obtain high coercive force. ε-Iron oxide contained in the ε-iron oxide particles is preferably crystal-oriented preferentially in the thickness direction (vertical direction) of the magnetic recording medium 10.

The ε-iron oxide particles have a spherical shape or a substantially spherical shape, or have a cubic shape or a substantially cubic shape. The ε-iron oxide particles have a shape as described above, and therefore in a case where the ε-iron oxide particles are used as the magnetic particles, the contact area between the particles in the thickness direction of the medium can be reduced and aggregation of the particles can be suppressed as compared with a case where barium ferrite particles having a hexagonal plate shape are used as the magnetic particles. Therefore, the dispersibility of the magnetic powder can be enhanced to obtain a more excellent signal-to-noise ratio (SNR).

The ε-iron oxide particle has a core-shell structure or a Janus structure. Specifically, the ε-iron oxide particle includes a core and a shell having a two-layer structure provided around the core. The shell having a two-layer structure includes a first shell provided on the core and a second shell provided on the first shell. In the present technology, capture of fatty acid may be suppressed by controlling the surface activity of the magnetic powder by the core-shell structure.

The core contains ε-iron oxide. The ε-iron oxide contained in the core preferably includes a ε—$Fe_2O_3$ crystal as a main phase, and more preferably includes a single-phase ε—$Fe_2O_3$.

The first shell covers at least a part of the periphery of the core. Specifically, the first shell may partially cover the periphery of the core or may cover the entire periphery of the core. From the viewpoint of achieving sufficient exchange coupling between the core and the first shell and improving a magnetic characteristic, the entire surface of the core is preferably covered.

The first shell is a so-called soft magnetic layer, and can contain, for example, a soft magnetic material such as α-Fe, a Ni—Fe alloy, or a Fe—Si—Al alloy. α-Fe may also be obtained by reducing ε-iron oxide contained in the core.

The second shell is an oxide coating as an oxidation resistant layer. The second shell can contain α-iron oxide, aluminum oxide, or silicon oxide. α-Iron oxide can include, for example, at least one iron oxide of $Fe_3O_4$, $Fe_2O_3$, or FeO. In a case where the first shell contains α-Fe (a soft magnetic material), α-iron oxide may be obtained by oxidizing α-Fe contained in the first shell.

If the ε-iron oxide particle has the first shell as described above, thermal stability can be ensured, and thus the coercive force Hc of the core alone can be maintained at a large value and/or the coercive force Hc of whole ε-iron oxide particles (core-shell particles) can be adjusted to a coercive force Hc suitable for recording. Furthermore, if the ε-iron oxide particle has the second shell as described above, it is possible to suppress deterioration of a characteristic of the ε-iron oxide particle caused by rust and the like on a particle surface due to exposure of the ε-iron oxide particle to the air at a manufacturing process of the magnetic recording medium 10 and before the process. Therefore, deterioration of a characteristic of the magnetic recording medium 10 can be suppressed.

The ε-iron oxide particle may have a shell having a single-layer structure. In this case, the shell has a configuration similar to that of the first shell. However, from the viewpoint of suppressing deterioration of a characteristic of the ε-iron oxide particle, the ε-iron oxide particle preferably has a shell having a two-layer structure.

The ε-iron oxide particle may contain an additive instead of having a core-shell structure, or may have a core-shell structure and contain an additive. In these cases, a part of Fe in the ε-iron oxide particle is substituted with the additive. If the ε-iron oxide particle contains an additive, the coercive force Hc of whole ε-iron oxide particles can also be adjusted to a coercive force Hc suitable for recording, and therefore the recordability can be improved. The additive is a metal element other than iron, preferably a trivalent metal element, and more preferably one or more selected from the group consisting of aluminum (Al), gallium (Ga), and indium (In).

Specifically, the ε-iron oxide containing an additive is an ε—$Fe_{2-x}M_xO_3$ crystal (here, M is a metal element other than iron, preferably a trivalent metal element, and more preferably one or more selected from the group consisting of Al, Ga, and In, and x is, for example, 0<x<1).

According to another preferred embodiment of the present technology, the magnetic powder may be a barium ferrite (BaFe) magnetic powder. A barium ferrite magnetic powder contains iron oxide magnetic particles including barium ferrite as a main phase (hereinafter, referred to as "barium ferrite particles"). A barium ferrite magnetic powder has high reliability of data recording so that, for example, the coercivity does not deteriorate even in a high-temperature and high-humidity environment. From such a viewpoint, a barium ferrite magnetic powder is preferable as the magnetic powder.

The average particle size of the barium ferrite magnetic powder can be 50 nm or less, more preferably 10 nm or more and 40 nm or less, and still more preferably 12 nm or more and 25 nm or less.

In a case where the magnetic layer 13 contains a barium ferrite magnetic powder as the magnetic powder, the average thickness $t_m$ [nm] of the magnetic layer 13 can be preferably 0.08 μm or less, more preferably 0.07 μm or less, and still more preferably 0.06 μm or less. Furthermore, the coercive force Hc measured in the thickness direction (vertical direction) of the magnetic recording medium 10 can be preferably 160 kA/m or more and 280 kA/m or less, more preferably 165 kA/m or more and 275 kA/m or less, and still more preferably 170 kA/m or more and 270 kA/m or less.

According to still another preferred embodiment of the present technology, the magnetic powder can be a cobalt ferrite magnetic powder. The cobalt ferrite magnetic powder contains iron oxide magnetic particles including cobalt ferrite as a main phase (hereinafter, referred to as "cobalt ferrite magnetic particles"). The cobalt ferrite magnetic particles preferably have uniaxial anisotropy. The cobalt ferrite magnetic particles have, for example, a cubic shape or a substantially cubic shape. The cobalt ferrite is cobalt ferrite containing Co. The cobalt ferrite may further contain one or more selected from the group consisting of Ni, Mn, Al, Cu, and Zn in addition to Co.

The cobalt ferrite has, for example, an average composition represented by the following formula (1).

$$Co_xM_yFe_2O_z \quad (1)$$

(Here, in the formula (1), M is, for example, one or more metals selected from the group consisting of Ni, Mn, Al, Cu, and Zn, x is a value within a range of $0.4 \leq x \leq 1.0$, y is a value within a range of $0 \leq y \leq 0.3$, where x and y satisfy a relationship of $(x+y) \leq 1.0$, z is a value within a range of $3 \leq z \leq 4$, and a part of Fe may be substituted with another metal element.)

The average particle size of the cobalt ferrite magnetic powder can be preferably 25 nm or less, and more preferably 23 nm or less. The coercive force Hc of the cobalt ferrite magnetic powder can be preferably 2500 Oe or more, and more preferably 2600 Oe or more and 3500 Oe or less.

According to still another preferred embodiment of the present technology, the magnetic powder can include a powder of nanoparticles containing hexagonal ferrite (hereinafter, also referred to as "hexagonal ferrite particles"). The hexagonal ferrite particles have, for example, a hexagonal plate shape or a substantially hexagonal plate shape. The hexagonal ferrite can preferably contain at least one of Ba, Sr, Pb, or Ca, and more preferably at least one of Ba or Sr. Specifically, the hexagonal ferrite may be, for example, barium ferrite or strontium ferrite. The barium ferrite may further contain at least one of Sr, Pb, or Ca in addition to Ba. The strontium ferrite may further contain at least one of Ba, Pb, or Ca in addition to Sr.

More specifically, the hexagonal ferrite can have an average composition represented by a general formula $MFe_{12}O_{19}$. Here, M is, for example, at least one metal of Ba, Sr, Pb, or Ca, and preferably at least one metal of Ba or Sr. M may be a combination of Ba and one or more metals selected from the group consisting of Sr, Pb, and Ca. Furthermore, M may be a combination of Sr and one or more metals selected from the group consisting of Ba, Pb, and Ca. In the above-described general formula, a part of Fe may be substituted with another metal element.

In a case where the magnetic powder includes a powder of hexagonal ferrite particles, the average particle size of the magnetic powder can be preferably 50 nm or less, more preferably 10 nm or more and 40 nm or less, and still more preferably 15 nm or more and 30 nm or less.

(First Particles)

The first particles have conductivity. As the first particles, fine particles can be used that contain carbon as a main component, and the fine particles may be, for example, preferably carbon particles. Examples of such carbon particles include carbon black. As the carbon black, for example, Asahi #15, #15HS, and the like manufactured by Asahi Carbon Co., Ltd. can be used. Furthermore, hybrid carbon may be used in which carbon is attached to a silica particle surface.

(Second Particles)

The second particles can have a Mohs hardness of 7 or more, preferably 7.5 or more, more preferably 8 or more, and still more preferably 8.5 or more from the viewpoint of suppressing deformation due to contact with a magnetic head. From the viewpoint of suppressing wear of the head, the Mohs hardness of the second particles can be preferably 9.5 or less. The second particles may be preferably inorganic particles, and examples of the second particles include α-$Al_2O_3$ (α-alumina) having an α transformation rate of 90% or more, β-$Al_2O_3$ (β-alumina), γ-$Al_2O_3$ (γ-alumina), silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-like α-iron oxide obtained by subjecting a raw material of magnetic iron oxide to dehydration and annealing treatment, a product obtained by subjecting the above-described needle-like α-iron oxide to surface treatment with aluminum and/or silica as necessary, diamond powder, and the like. As the second particles, alumina particles such as α-$Al_2O_3$ (α-alumina), β-$Al_2O_3$ (β-alumina), γ-$Al_2O_3$ (γ-alumina), and the like, and silicon carbide are preferably used. These second particles may have any shape such as a needle shape, a spherical shape, a dice shape, or the like, and preferably have a shape including a corner part because such particles have high abrasivity.

(Average Height of Protrusions Formed by Second Particles)

Protrusions are formed by the second particles on the magnetic layer side surface.

The average height ($H_2$) of the protrusions formed by the second particles can be 7 nm or less, preferably 6.5 nm or less, more preferably 6.0 nm or less, still more preferably 5.5 nm or less, and still even more preferably 5.3 nm or less. If the magnetic recording medium has an average height ($H_2$) of the protrusions formed by the second particles within the above numerical range, the spacing between the magnetic head and the magnetic recording medium is small, and a friction increase due to many times of traveling is less likely to occur, resulting in contribution to enabling appropriate maintenance of the polishing force on the magnetic head.

Furthermore, the lower limit of the average height ($H_2$) of the protrusions formed by the second particles is not particularly limited, and can be, for example, preferably 2.0 nm or more, more preferably 2.5 nm or more, and still more preferably 3.0 nm or more.

(Lubricant)

The magnetic layer 13 contains a lubricant. The lubricant may be one or more selected from fatty acids and fatty acid esters, and can preferably contain both a fatty acid and a fatty acid ester.

The fatty acid may be preferably a compound represented by the following general formula (1) or (2). For example, one or both of the compound represented by the general formula (1) and the compound represented by the general formula (2) described below may be contained as the fatty acid.

Furthermore, the fatty acid ester may be preferably a compound represented by the following general formula (3) or (4). For example, one or both of the compound represented by the general formula (3) and the compound represented by the general formula (4) described below may be contained as the fatty acid ester.

If the lubricant contains any one or both of the compound represented by the general formula (1) and the compound represented by the general formula (2), and/or any one or both of the compound represented by the general formula (3) and the compound represented by the general formula (4), damage to the magnetic head can be prevented and a decrease in output can be suppressed.

$$CH_3(CH_2)_kCOOH \quad (1)$$

(Here, in the general formula (1), k is an integer selected from a range of 14 or more and 22 or less, and more preferably a range of 14 or more and 18 or less.)

$$CH_3(CH_2)_nCH{=}CH(CH_2)_mCOOH \quad (2)$$

(Here, in the general formula (2), the sum of n and m is an integer selected from a range of 12 or more and 20 or less, and more preferably a range of 14 or more and 18 or less.)

$$CH_3(CH_2)_pCOO(CH_2)_qCH_3 \quad (3)$$

(Here, in the general formula (3), p is an integer selected from a range of 14 or more and 22 or less, and more preferably a range of 14 or more and 18 or less, and q is an integer selected from a range of 2 or more and 5 or less, and more preferably a range of 2 or more and 4 or less.)

$$CH_3(CH_2)_rCOO—(CH_2)_sCH(CH_3)_2 \quad (4)$$

(Here, in the general formula (4), r is an integer selected from a range of 14 or more and 22 or less, and s is an integer selected from a range of 1 or more and 3 or less.)

Specific examples of the fatty acid and the fatty acid ester include the following. Examples of the fatty acid include capric acid, lauric acid, myristic acid, palmitic acid, stearic acid, oleic acid, elaidic acid, linoleic acid, linolenic acid, and the like.

Furthermore, examples of the fatty acid ester include butyl caprate, octyl caprylate, ethyl laurate, butyl laurate, octyl laurate, ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, amide stearate, alkylamide stearate, butoxyethyl stearate, and the like.

(Binder)

As the binder, a resin having a structure in which a crosslinking reaction is imparted to a polyurethane-based resin, a vinyl chloride-based resin, or the like is preferable. However, the binder is not limited thereto, and other resins may be appropriately blended according to a physical property and the like required for the magnetic recording medium 10. The resin to be blended is not particularly limited as long as it is usually used in a coating type magnetic recording medium 10.

Examples of the binder include polyvinyl chloride, polyvinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, or nitrocellulose), a styrene-butadiene copolymer, a polyester resin, an amino resin, synthetic rubber, and the like.

Furthermore, as the binder, a thermosetting resin or a reactive resin may be used, and examples thereof include a phenol resin, an epoxy resin, a urea resin, a melamine resin, an alkyd resin, a silicone resin, a polyamine resin, a urea-formaldehyde resin, and the like.

Furthermore, a polar functional group such as $—SO_3M$, $—OSO_3M$, —COOM, $P{=}O(OM)_2$, or the like may be introduced into each binder described above in order to improve the dispersibility of the magnetic powder. Here, in the formula, M is a hydrogen atom or an alkali metal such as lithium, potassium, sodium, or the like.

Moreover, examples of the polar functional group include a side chain type having an end group of —NR1R2 or $—NR1R2R3^+X^-$ and a main chain type of $>NR1R2^+X^-$. Here, in the formulae, each of R1, R2, and R3 is a hydrogen atom or a hydrocarbon group, and $X^-$ is an ion of a halogen element such as fluorine, chlorine, bromine, iodine, or the like, or an inorganic or organic ion. Furthermore, examples of the polar functional group include OH, —SH, —CN, an epoxy group, and the like.

(Additive)

The magnetic layer 13 may further contain aluminum oxide (α, β, or γ-alumina), chromium oxide, silicon oxide, diamond, garnet, emery, boron nitride, titanium carbide, silicon carbide, titanium carbide, titanium oxide (rutile type or anatase type titanium oxide), or the like, as non-magnetic reinforcing particles.

(Covering Agent)

The magnetic layer 13 may contain a covering agent in order to cover the surface of the magnetic powder. Examples of such a covering agent include organic acids having one or more polar groups such as carboxylic acid, phosphonic acid, sulfonic acid, and the like, their metal salts and the like that function as an acid group, coupling agents (such as silane, aluminum, titanium, and the like), carbon, metal oxides, hydroxides (of aluminum, yttrium, and the like), and the like. Examples of the organic acids include acetic acid, oxalic acid, citric acid, malonic acid, succinic acid, glutaric acid, adipic acid, phthalic acid, isophthalic acid, terephthalic acid, benzoic acid, toluic acid, p-hydroxybenzoic acid, naphthoic acid, naphthalenedicarboxylic acid, hydroquinone, phenylphosphonic acid, benzylphosphonic acid, phenethylphosphonic acid, diphenylmethylphosphonic acid, biphenylphosphonic acid, benzylphenylphosphonic acid, tolylphosphonic acid, hexylphosphonic acid, octylphosphonic acid, nonylphosphonic acid, decylphosphonic acid, undecylphosphonic acid, dodecylphosphonic acid, hexadecylphosphonic acid, octadecylphosphonic acid, benzenesulfonic acid, p-toluenesulfonic acid, hexylbenzenesulfonic acid, octylbenzenesulfonic acid, decylbenzenesulfonic acid, undecylbenzenesulfonic acid, dodecylbenzensulfonic acid, tridecylbenzenesulfonic acid, tetradecylbenzenesulfonic acid, hexadecylbenzenesulfonic acid, octadecylbenzenesulfonic acid, naphthalenesulfonic acid, and the like.

(Non-Magnetic Layer (Underlayer))

The non-magnetic layer (underlayer) 12 is a non-magnetic layer containing a non-magnetic powder and a binder as main components. The description regarding the binder contained in the magnetic layer 13 also applies to the binder contained in the non-magnetic layer 12. The non-magnetic layer 12 may further contain at least one additive of the first particles, a lubricant, a curing agent, a corrosion inhibitor, or the like, as needed.

The average thickness of the non-magnetic layer 12 can be preferably 1.2 μm or less, more preferably 1.0 μm or less, 0.9 μm or less, 0.8 μm or less, or 0.7 μm or less, and still more preferably 0.6 μm or less. Furthermore, the lower limit of the average thickness of the non-magnetic layer 12 is not particularly limited, and is preferably 0.2 μm or more, and more preferably 0.3 μm or more.

(Non-Magnetic Powder)

The non-magnetic powder contained in the non-magnetic layer 12 can contain, for example, at least one selected from inorganic particles and organic particles. One kind of non-magnetic powder may be used alone, or two or more kinds of non-magnetic powders may be used in combination. The inorganic particles include, for example, one or a combination of two or more selected from metals, metal oxides, metal carbonates, metal sulfates, metal nitrides, metal carbides, and metal sulfides. More specifically, the inorganic particles can be, for example, one or two or more selected from iron oxyhydroxide, hematite, titanium oxide, and carbon black. Examples of a shape of the non-magnetic powder include various shapes such as a needle shape, a spherical shape, a cubic shape, a plate shape, and the like, but are not particularly limited thereto.

(Covering Agent)

The non-magnetic layer 12 may contain a covering agent in order to cover the surface of the non-magnetic powder. Such a covering agent may be the same as that contained in the magnetic layer 13. Therefore, description of the covering agent is omitted.

(Back Layer)

The back layer 14 can contain a binder and a non-magnetic powder. The back layer 14 may contain various additives such as a lubricant, a curing agent, an antistatic agent, an organic acid, and the like, as needed. The descriptions regarding the binder and the non-magnetic powder contained in the above-described non-magnetic layer 12 also apply to the binder and the non-magnetic powder contained in the back layer 14.

The average particle size of the inorganic particles contained in the back layer 14 is preferably 10 nm or more and 150 nm or less, and more preferably 15 nm or more and 110 nm or less. The average particle size of the inorganic particles is determined in a manner similar to that for determination of the average particle size D of the magnetic powder described above.

The average thickness $t_b$ of the back layer 14 can be preferably 0.6 μm or less, more preferably 0.5 μm or less, and still more preferably 0.4 μm or less, 0.3 μm or less, 0.25 μm or less, or 0.2 μm or less. If the average thickness $t_b$ of the back layer 14 is within the above range, even in a case where the average thickness (average total thickness) $t_T$ of the magnetic recording medium 10 is $t_T \leq 5.7$ μm, the average thicknesses of the non-magnetic layer 12 and the base layer 11 can be kept thick, and thus the traveling stability of the magnetic recording medium 10 in a recording and reproducing apparatus can be maintained.

(3) Physical Properties and Structure (Extraction Rate of Fatty Acid and/or Fatty Acid Ester)

<Preliminary Preparation>

A. Setting of Sample Mount

Figure 18:
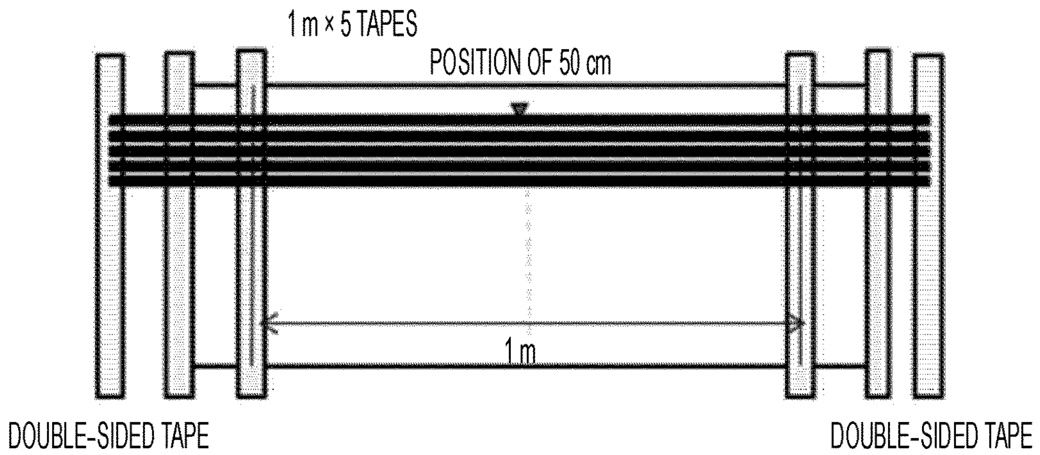
FIG. 18 is a view illustrating an example of a sample mount used for measuring the extraction rate of a fatty acid or a fatty acid ester.

Four sheets of graph paper are cut, and a 1 m-mark line is drawn at a position six squares inside each end so that the center is 1 m in size. FIG. 18 is a view illustrating an example of a sample mount used for measuring the extraction rate. As illustrated in FIG. 18, an inverted triangle mark is marked in the middle of the graph paper at a position of 50 cm. The graph paper is arranged parallel to the desk, and both ends of the graph paper are fixed with double-sided tapes. Double-sided tapes are attached so as to cover the two 1 m-mark lines, and thus a sample mount is set.

B. Preparation of Mixed Solvent of Acetonitrile and Ultrapure Water (Acetonitrile:Ultrapure Water=100:3))

Into 1000 ml of acetonitrile, 30 ml of ultrapure water is poured. After closing a lid, the mixture is gently shaken up and down, and degassed in an ultrasonic cleaner over 15 minutes while the lid is loosened.

C. Preparation of Aluminum Lid

A black lid, white rubber, and an aluminum sheet are set.

D. Preparation of Syringe

A filter is set on the outer shaft of a syringe. The inner shaft is also taken out at this time.

E. Preparation of Standard Reagents

The kind of the standard reagent depends on the fatty acid or the fatty acid ester used. Furthermore, the concentration is arbitrary. As an example, a case will be described in which stearic acid is used as the fatty acid and butyl stearate is used as the fatty acid ester. Standard reagents for stearic acid are prepared as follows. Stearic acid are weighed out in amounts of 4.0 mg, 10.0 mg, and 30.0 mg, and each weighed out stearic acid is diluted in a measuring flask with a solvent of acetonitrile/water=100/3 so that the resulting mixture has a volume of 200 mL. Standard reagents for butyl stearate are prepared as follows. Butyl stearate are weighed out in amounts of 10.0 mg, 30.0 mg, and 40.0 mg, and each weighed out butyl stearate is diluted in a measuring flask with a solvent of acetonitrile/water=100/3 so that the resulting mixture has a volume of 200 mL.

Standard reagents for stearic acid (purity: 95.0%, manufactured by JUNSEI CHEMICAL CO., LTD.) are prepared. Standard reagents for butyl stearate (purity: 95.0%, manufactured by JUNSEI CHEMICAL CO., LTD.) are prepared.

<Start-Up of Reversed Phase Liquid Chromatography>

As reversed phase liquid chromatography (HPLC), Ultimate 3000 (manufactured by Thermo Fisher Scientific Inc.) (column: ODS-2 5 μm 4.6×150 mm (GL Sciences)) is used. A pump, an auto-sampler, a differential refractometer (Shodex RI-101, manufactured by Showa Denko K.K., preset temperature: 30° C.), and a PC are each turned on. The pump is purged for 5 minutes. Wash of the auto-sampler is performed. Software is started. The flow rate/pressure is increased to 2 ml, thus the liquid starts to flow, and then stabilization is waited for for 1 hour or more. Note that the measurement conditions are set so that the mobile phase acetonitrile/water=100/3 (volume ratio), the solvent acetonitrile/water=100/3, the column temperature is 40° C., the measurement time is 10 minutes, the flow rate is 2 ml per minute, and the injection volume is 200 μl.

<Preparation of Standard Reagent>

The prepared standard reagent is subjected to a treatment with an ultrasonic cleaner for 15 minutes. After completion of the ultrasonic treatment, the syringe to which the filter is set is inserted into a vial, and the standard reagent is directly poured into the syringe. The standard reagent is put into the vial. The inner shaft is pushed, and the liquid is pushed out into the vial. When the vial is filled to about the shoulder level, the aluminum lid is closed. The standard reagent remaining in the syringe is passed through the filter and returned into a screw tube vial.

<Sampling>

A magnetic tape T accommodated in a cartridge 10A is unwound, and the magnetic tape T is cut out in a length of about 5 m at a position 20 m from the connection portion between the magnetic tape T and a leader tape LT in the longitudinal direction. Using lines of the graph paper, the magnetic tape is attached to the double-sided tapes on the sample mount with Mag/Back alternately overlapped in parallel. Note that care is to be taken not to apply too much tension at the time of attaching the magnetic tape. The P/C surface layer is discarded, and 1 m×5 magnetic tapes are collected. A ruler is placed along the 1 m-mark line of the sample mount, and the magnetic tape is cut out in 1 m with a cutter. The five magnetic tapes are collectively picked up at the center indicated by the inverted triangle mark with tweezers and folded in two, and the curled portion at the end is gripped and wrinkled. While separated one by one, the magnetic tapes are put into a 120 ml round bottom flask, and the flask is covered with aluminum foil.

A. Extraction for 5 Minutes

Into a 100 ml graduated cylinder, 60 ml of hexane is measured out. A stopwatch is set to 5 minutes. A 120 ml screw tube containing the sample is installed in an automatic shaker placed in an environment of 25° C., and the aluminum lid is opened. The measured out 60 ml of hexane is put into the 120 ml round bottom flask, the flask is covered with an aluminum lid, and the stopwatch and the automatic shaker are turned on at the same time to start shaking (at a rotation speed of the automatic shaker set to 300 rpm). After 5 minutes from the start of shaking, 50 ml of the sample is measured out and transferred into a 100 ml graduated cylinder. The sample in the graduated cylinder is transferred into an eggplant flask. The eggplant flask containing the sample is fitted into the eggplant flask attachment port of an evaporator and fixed. The evaporator is started, the rotation speed of the eggplant flask is set to 50 rpm, and the eggplant flask is rotated. Vacuuming is started to 160 hPa. The eggplant flask is immersed in a hot water bath. In about 4 minutes, hexane is evaporated, and only the fatty acid or the fatty acid ester is left in the eggplant flask. When hexane is completely removed, the eggplant flask is pulled up from the hot water bath. The pressure reduction is ceased, and the pressure is released to an atmospheric pressure (around 1013 hPa). The rotation of the evaporator is stopped. The eggplant flask is detached and dried.

B. Solvent Substitution

Into the dried eggplant flask after hexane is evaporated by the evaporator, 5 ml of a mixed solvent of acetonitrile and ultrapure water is pipetted and poured from the neck of the eggplant flask. The eggplant flask is covered with an aluminum lid, and shaken while the neck of the eggplant flask is held. An ultrasonic treatment is performed for 15 minutes. After the ultrasonic treatment, the eggplant flask is shaken again, and all the liquid is put into a vial to which a syringe with a 0.5 μm filter is set. The inner shaft is pushed, the vial is filled with the liquid to the shoulder level and covered, and the liquid remaining in the syringe is discarded.

C. HPLC Measurement

After completion of start-up of reverse phase liquid chromatography (HPLC), measurement is started.

<Extraction of Total Amount>

The preliminary preparation, the preparation of a standard sample, and the sampling are performed in the same procedures as in the extraction for five minutes, and therefore description thereof is omitted.

Into a 100 ml graduated cylinder, 60 ml of hexane is measured out. A stopwatch is set to 1 hour. A 110 ml screw tube containing the sample is installed in an ultrasonic treatment machine (UT-105HS, manufactured by Sharp Corporation), and the aluminum lid is opened. The ultrasonic treatment machine has a water bath (water temperature: 40 to 50° C.), and the water bath is filled with water to the water level of the upper limit line, and the ultrasonic power is set to 100%. The measured out 60 ml of hexane is put into a 120 ml screw tube, the screw tube is covered with an aluminum lid, and the stopwatch and the ultrasonic treatment machine are turned on at the same time to start extraction. After 1 hour from turning on the ultrasonic treatment machine, hexane is evaporated from the sample in the 110 ml screw tube using an evaporator with the same method as in the extraction for 5 minutes. Thereafter, solvent substitution is performed in the same procedure as in the extraction for 5 minutes, except that 5 ml of a mixed solvent (in a case where the peak area of HPLC is out of the measurable range due to too high a concentration, 10 ml of a mixed solvent) of acetonitrile and ultrapure water is added to the sample in the eggplant flask, and measurement is performed.

<Data Analysis>

Data analysis is performed in accordance with the following procedure.

(1) The area value of the standard reagent is determined, and a calibration curve is prepared (in the form of y=ax).

(2) The area value of the measurement sample is determined, and the concentration is calculated from the calibration curve (using the same method of obtaining the peak area as for the standard reagent). Thereafter, the amount (mg) of the fatty acid or the amount (mg) of the fatty acid ester in 5 ml (or 10 ml) of the acetonitrile solution is determined.

(3) The amount of the fatty acid or the amount of the fatty acid ester is converted to the extraction amount (mg/$m^2$) on the basis of the following formula.

Extraction amount=(amount of fatty acid or amount of fatty acid ester*(60/50))/tape area Amount of fatty acid or amount of fatty acid ester=numerical value determined in (2) above Tape area 5 m=0.06325 $m^2$ (½ inches×length [m])

*In the fatty acid or the fatty acid ester extracted in 60 ml of hexane, the amount of the fatty acid or the amount of the fatty acid ester in 50 ml of the hexane is measured, and therefore correction is performed.

(Height of Protrusion)

As described below, the height of a protrusion formed by a second particle is measured by, in the same site of the measurement sample, performing shape analysis with an atomic force microscope (hereinafter, referred to as AFM) and performing discrimination of a component subjected to image analysis using a luminance difference due to a difference in the amount of secondary electron emission between the first particles and the second particles from the FE-SEM image imaged with a field emission scanning electron microscope (hereinafter, referred to as FE-SEM). The height of a protrusion can be measured with the AFM, and which of a first particle or a second particle has formed the protrusion can be specified by the FE-SEM. The image obtained by the AFM and the image obtained by the FE-SEM in the certain region are superimposed for the same site to obtain a composite image, and from the obtained composite image, the kind of a particle forming each protrusion (whether the particle is the first particle or the second particle) and the height of each protrusion can be made correspond to each other.

Hereinafter, a method of measuring the height of a protrusion using an AFM, a method of specifying the kind of a particle forming a protrusion using a FE-SEM, and a method of making the height of a protrusion and the kind of the particle forming the protrusion correspond to each other will be described.

(Method of Measuring Height of Protrusion Using Atomic Force Microscope (AFM))

Figure 7:
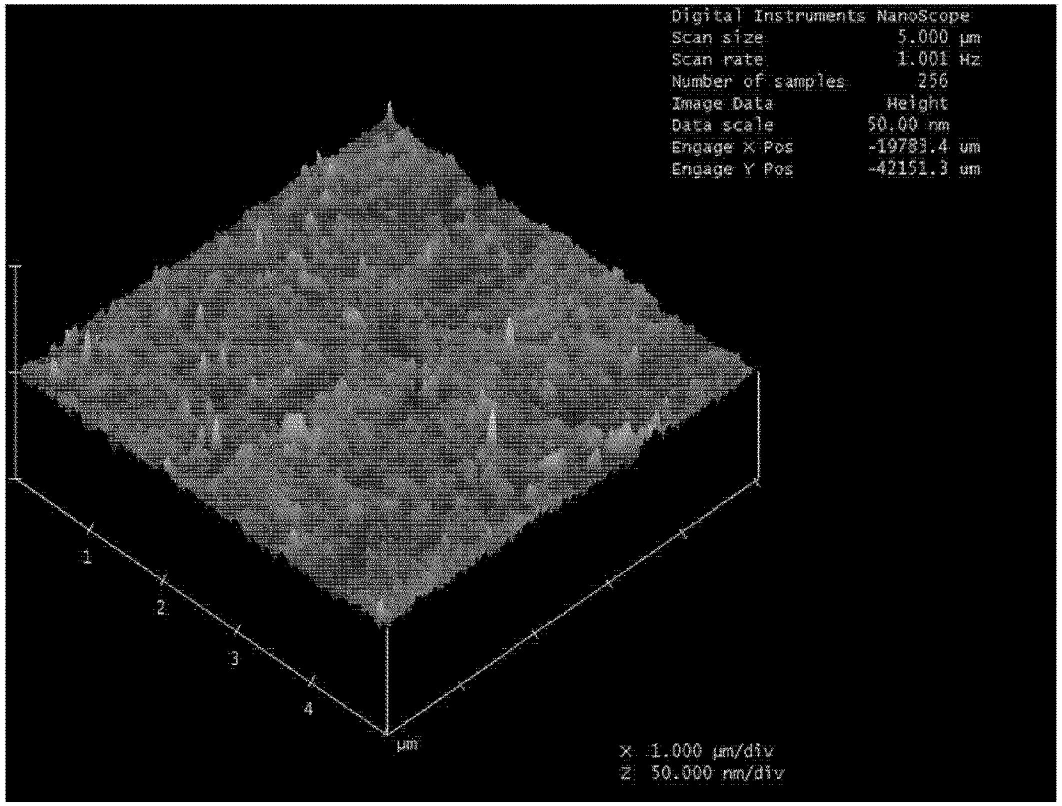
FIG. 7 is an image showing an example of a surface shape imaged with an AFM.
Figure 8:
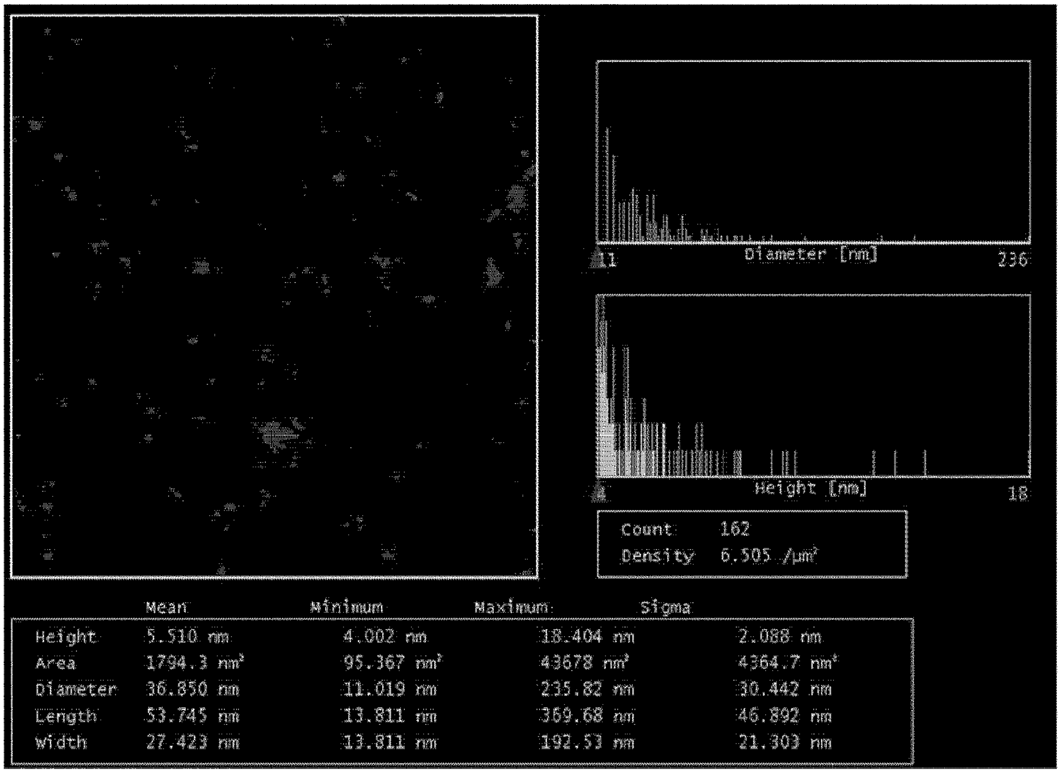
FIG. 8 is a view showing an example of a protrusion analysis result by an AFM.
Figure 9:
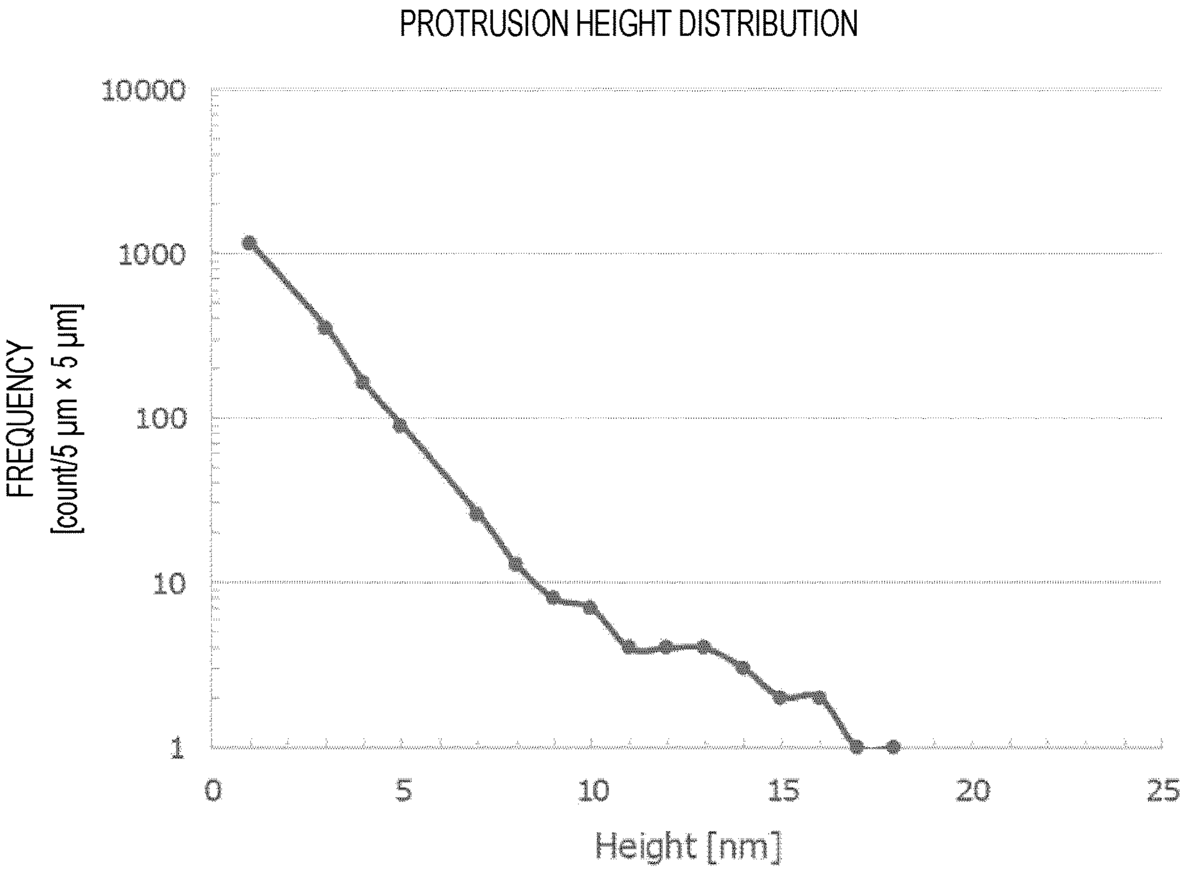
FIG. 9 is a view showing an example of protrusion height distribution with an AFM.

In the present technology, the height of a protrusion formed by a second particle is determined as follows. First, a measurement sample is prepared by cutting out, in a size such that the measurement sample can be placed on a sample stage for SEM observation, from the magnetic recording medium 10 in a user data area (24 m or more from a reader pin) in an LTO cartridge. Next, the measurement sample surface excluding the central portion of the measurement sample is marked. Examples of the method of marking include a method of forming a recess in a linear or dotted shape on the magnetic recording medium 10 with a manipulator, a nanoindenter, or the like, a method of forming a protrusion on the magnetic recording medium 10 with a silver paste or the like, and the like. Note that in an AFM, the marked portion is scanned with a probe, and therefore the probe tip may be contaminated and an accurate shape image may be not obtained according to the state of the marked portion, so that the marking is preferably small and shallow so as not to contaminate the probe. Next, the marked portion on the measurement sample surface is subjected to shape analysis with an AFM. Since the marked portion with the marking is recessed, measurement is performed at a viewing angle of 5 μm×5 μm with the AFM so that the marked portion is as close as possible to the edge of the visual field. Note that protrusions in the surrounding portion of the marked portion are not to be measured. Next, measurement is performed at a viewing angle of 10 μm×10 μm, a part as a mark is determined, and a part with no marking is measured at a viewing angle of 5 μm×5 μm in accordance with the part as a mark. The measurement conditions for the shape analysis are as described below. For the second particles, in a case where 20 or more particles can be specified in one visual field of the AFM from one measurement sample, the one visual field is measured with the AFM. For the second particles, in a case where the number of particles that can be specified in one visual field of the AFM is less than 20, a plurality of (for example, 3 to 5) visual fields is measured from one measurement sample. For the second particles, 20 points specified as particles by binarization processing are secured, the values obtained by measuring the 20 points with the AFM are averaged, and the obtained average value is regarded as the height of the protrusions. Information regarding the surface shape, the protrusion analysis, and the height distribution of the protrusions can be obtained by the shape analysis. FIG. 7 is an example of an image showing an example of a surface shape imaged with an AFM. FIG. 8 is a view showing an example of a protrusion analysis result by an AFM. FIG. 9 is a view showing an example of protrusion height distribution. From the obtained information, data can be obtained such as the number of protrusions formed, the height of the protrusions formed by the particles, and the like.

<AFM Measurement Conditions>

Apparatus: AFM Dimension 3100 microscope (with NanoscopeIV controller) (Digital Instruments, USA)

Measurement mode: tapping

Tapping frequency during tuning: 200 to 400 kHz

Cantilever: SNL-10 (manufactured by Bruker Corporation)

Scan size: 5 μm×5 μm

Scan rate: 1 Hz

Scan line: 256

<Method of Calculating Reference Plane in Calculating Protrusion Height>

The AFM image is divided into 256×256 (=65,536) measurement points, the height Z(i) (i: measurement point number, i=1 to 65,536) is measured at each measurement point, and the measured heights Z(i) at the measurement points are simply averaged (arithmetically averaged) to determine the average height (reference plane) $Z_{ave}$ (=(Z(1)+Z(2)+ . . . +Z(65,536))/65,536).

(Method of Specifying Kind of Particle Forming Protrusion Using FE-SEM)

Figure 10:
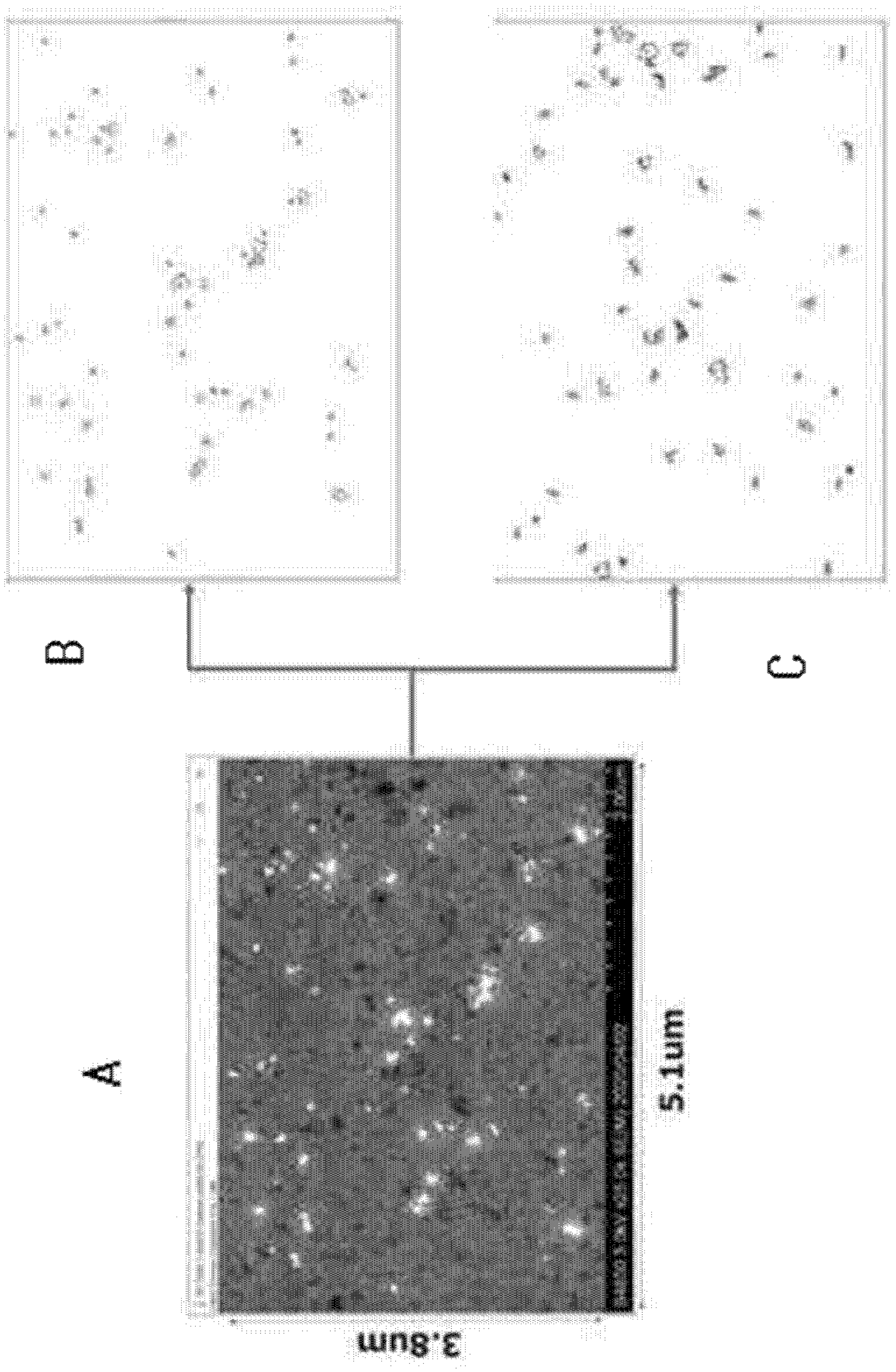
FIG. 10 is an example of a FE-SEM image.

The marked portion of the measurement sample is imaged under the FE-SEM measurement conditions described below using a field emission scanning electron microscope (FE-SEM) to obtain a FE-SEM image. A of FIG. 10 is an example of a FE-SEM image. From the obtained FE-SEM image, the kind of a particle forming a protrusion can be specified using a luminance difference due to a difference in the amount of secondary electron emission between the first particles and the second particles. Image processing for the specification will be described below. Furthermore, the position of a protrusion formed by each of the first particles and the second particles in the FE-SEM image is identified.

<FE-SEM Measurement Conditions>

Apparatus: HITACHI S-4800 (manufactured by Hitachi High-Technologies Corporation)

Viewing angle: 5.1 μm×3.8 μm

Acceleration voltage: 5 kV

Measurement magnification: 25000 times

The obtained FE-SEM image (A of FIG. 10) is subjected to binarization processing under each of two processing conditions described below using image processing software ImageJ. From the image obtained by the binarization processing, information is obtained regarding the number of protrusions formed by particles for each of the first particle and the second particle, the average area of one protrusion, the total area of the protrusions, and the diameter of the protrusion (Feret diameter). Note that, in the binarization processing, the conditions are changed as follows between the second particles having a high luminance (the white portions in A of FIG. 10) and the first particles having a low luminance (the black portions in A of FIG. 10).

<Binarization Processing Conditions for Obtaining Information Regarding First Particles>

Software: ImageJ Ver 1.44p

Binarization threshold value: Threshold (0.65)

Binarization target size: 0.002 μm-infinity

<Binarization Processing Conditions for Obtaining Information Regarding Second Particles>

Software: ImageJ Ver 1.44p

Binarization threshold value: Threshold (220,255)

Binarization target size: 0.001 μm-infinity

B of FIG. 10 is an image showing positional distribution of protrusions formed by the second particles (alumina particles), obtained by binarizing the FE-SEM image of A of FIG. 10 under the binarization processing conditions for the second particles (alumina particles). The following information regarding the second particles was obtained from the obtained image.

<Obtained Information Regarding Second Particles>

Number: 58

Average area: 0.003 $\mu m^2$

Total area: 0.198 $\mu m^2$

Feret diameter: 0.091 μm

C of FIG. 10 is an image showing positional distribution of protrusions formed by the first particles (carbon black particles), obtained by binarizing the FE-SEM image of A of FIG. 10 under the binarization processing conditions for the first particles (carbon black particles). The following information regarding the first particles was obtained from the obtained image.

<Obtained Information Regarding First Particles>

Number: 55

Average area: 0.005 $\mu m^2$

Total area: 0.262 $\mu m^2$

Feret diameter: 0.013 μm (Method of Making Height of Protrusion and Kind of Particle Forming Protrusion Correspond to Each Other)

The obtained AFM image and the FE-SEM image before the binarization processing are superimposed to obtain a composite image. The composited image is used for specifying which of a first particle or a second particle has formed each protrusion.

Figure 11:
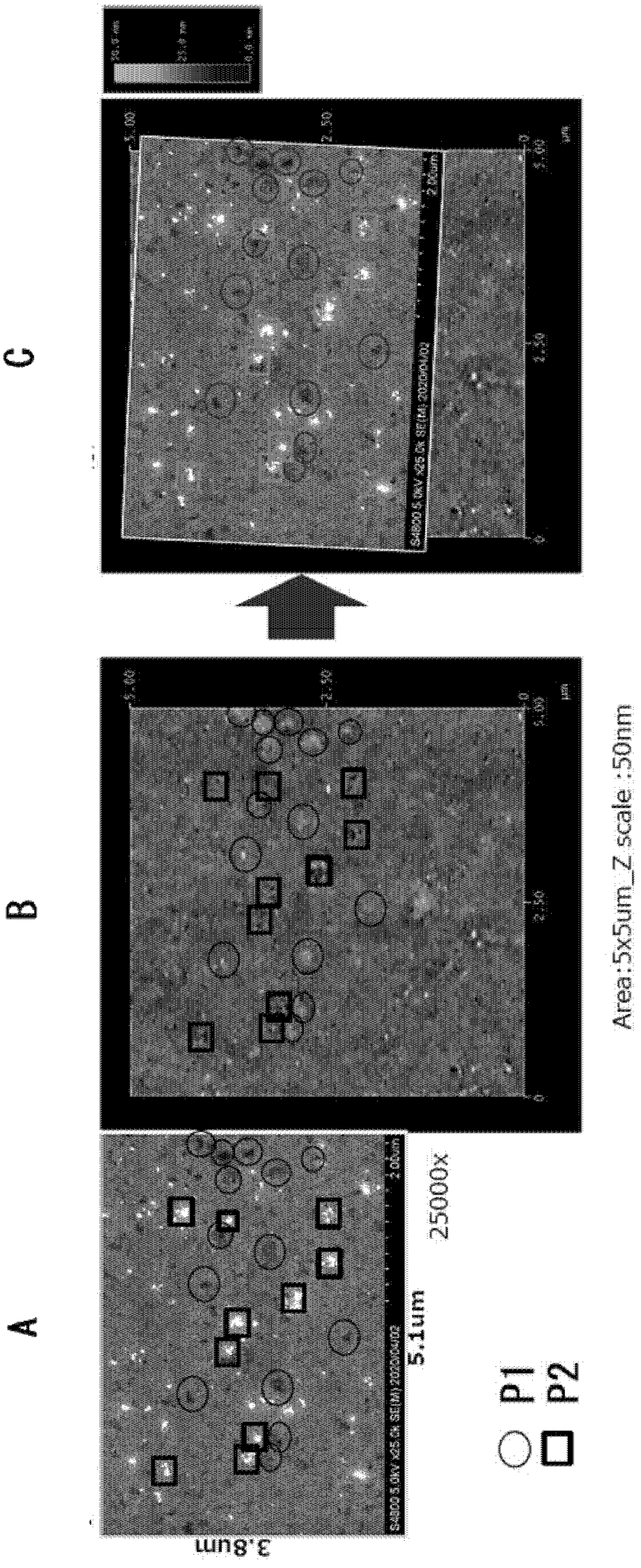
FIG. 11 is a composite image in which an AFM image and a FE-SEM image are superimposed.

For example, C of FIG. 11 is a composite image obtained by superimposing an AFM image (B of FIG. 11) and a FE-SEM image (A of FIG. 11) so that respective positions of corresponding protrusions coincide with each other. In FIG. 11, in the FE-SEM image before image compositing (A of FIG. 11), the position of a protrusion formed by a first particle P1 and the position of a protrusion formed by a second particle P2, which are discriminated by the binarization processing, are marked with different marks so that the respective positions can be discriminated. Similarly, in the AFM image before image compositing (B of FIG. 11), the position of a protrusion formed by a first particle (carbon black particle) P1 and the position of a protrusion formed by a second particle (alumina particle) P2, which are discriminated by the binarization processing, are marked with different marks so that the respective positions can be discriminated. The AFM image (B of FIG. 11) and the FE-SEM image (A of FIG. 11) are superimposed so that the respective positions of corresponding protrusions coincide with each other to obtain a composite image, and from the composite image, which of the first particle P1 or the second particle P2 has formed each protrusion is discriminated. Note that in B of FIG. 11, no marking is present in the image because the marked portion is measured at a viewing angle of 10 μm×10 μm with the AFM and then a part with no marking is measured at a viewing angle of 5 μm×5 μm.

Next, the height of each protrusion in the composite image is measured using AFM analysis software (Software version 5.12 Rev. B for Dimension 3100, manufactured by Veeco Instruments Inc.). For each protrusion, the kind of the particle forming the protrusion (whether the particle is the first particle or the second particle) is specified as described above, and therefore the specified kind of the particle can be made correspond to the measured height.

Figure 12:
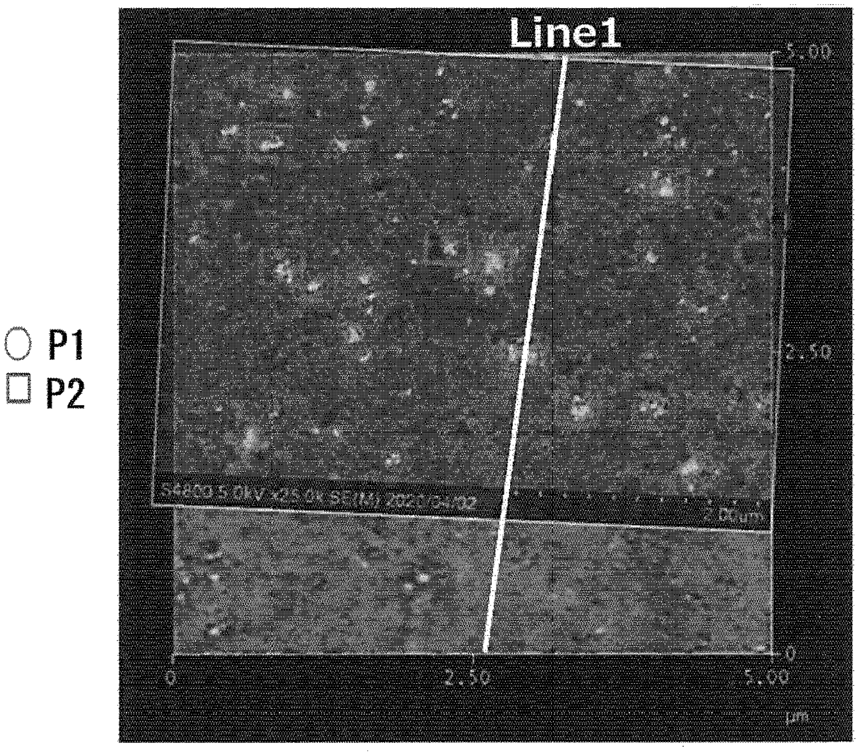
FIG. 12 is an enlarged view of a composite image in which an AFM image and a FE-SEM image are superimposed.
Figure 13:
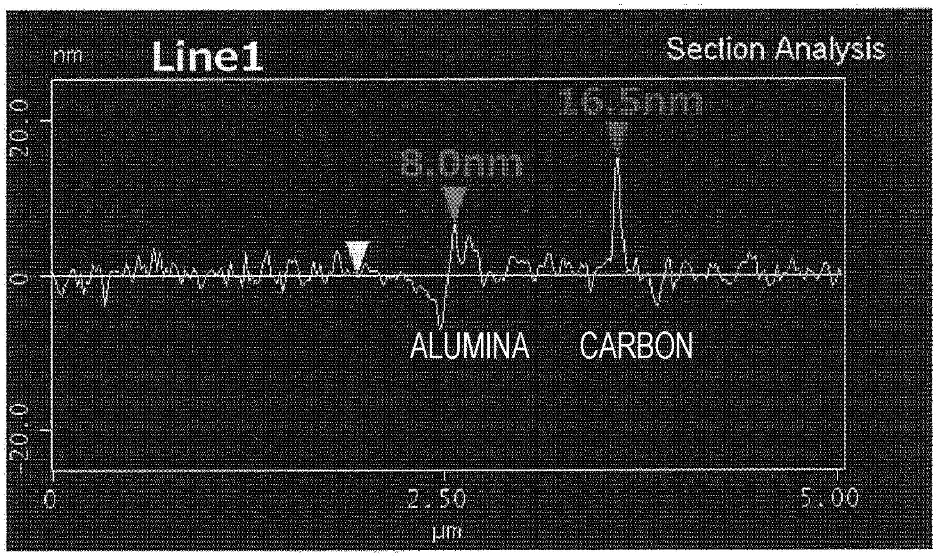
FIG. 13 is a view showing an example of an analysis result by an AFM for the line 1 (Line1) in FIG. 12.

For example, FIG. 12 is an enlarged view of a composite image in which an AFM image and a FE-SEM image are superimposed. FIG. 13 is a view showing an analysis result by an AFM (measurement result of the protrusion height) for the line 1 (Line1) set at an arbitrary position in FIG. 12. As shown in FIG. 13, the height of a protrusion formed by a second particle (alumina particle) present on the line 1 can be specified. In this manner, the height of a protrusion is specified from the composite image and the AFM analysis result.

(Average Height of Protrusions)

The average height of the protrusions formed by the second particles is determined from the information regarding the height of a protrusion obtained as described above. The average height of the protrusions can be determined from, for example, cumulative frequency distribution of the protrusions formed by the second particles.

Figure 14:
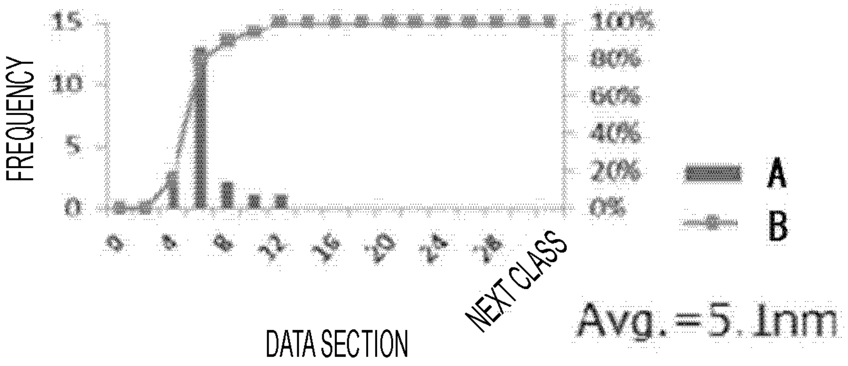
FIG. 14 is a view showing cumulative frequency distribution of heights of protrusions formed by second particles (alumina particles).

Furthermore, for example, FIG. 14 is a view showing cumulative frequency distribution of heights of protrusions formed by the second particles (alumina particles). In FIG. 14, A indicates frequency, and B indicates cumulative %. FIG. 14 shows that the average height of the protrusions formed by the second particles (alumina particles) is 5.1 nm.

(Deposit)

A so-called full volume test (traveling test over the entire length and the entire surface) is performed in which data is recorded on the entire surface of the magnetic tape and reproduced. Thereafter, the magnetic head of the drive is observed with an optical microscope to confirm whether or not the constituent material of the magnetic layer is adhered to the magnetic head. Next, the adhesion of the constituent material of the magnetic layer to the magnetic head after traveling over the entire length and the entire surface is evaluated in accordance with the following three-stage criteria.

[Criteria]

○: No adhesion of the constituent material of the magnetic layer to the head is observed.

Δ: In the tape traveling surface of the head, adhesion of the constituent material of the magnetic layer is observed only in the edge part where the tape edge travels.

x: Adhesion of the constituent material of the magnetic layer is observed in any part of the tape traveling surface of the head.

If the evaluation result is "o" or "A", no problem occurs in reliability of the magnetic tape.

If the evaluation result is "x", short-time head clogging occurs, and the cartridge lacks total capacity.

(Deterioration of Output)

Deterioration of output due to magnetic head damage is evaluated in accordance with the following procedure.

(1) The output (2T, 8T) of the drive and the head resistance before evaluation are measured.

(2) A test is started under an ambient environment. Recording over the entire surface and the entire length is performed in one tape, and after completion, the cartridge is replaced with a new one.

(3) The drive output and the head resistance are measured for every 25 tapes, and the output change and the head resistance change are confirmed. The degree of deterioration (dB) is confirmed on the basis of the drive output before evaluation.

(4) The operation of (3) above is repeated for 50 tapes.

Next, deterioration of drive output after traveling of 50 tapes is evaluated in accordance with the following four-stage criteria.

[Criteria]

◎: 2.5 dB or less

○: 3 dB or less

Δ: more than 3 dB

×: 4 dB or more

If the evaluation result is "Δ", the capacity loss, the rewrite, and the error rate deteriorate. In the case of "×", actual damage occurs.

(Average Thickness (Average Total Thickness) $t_T$ of Magnetic Recording Medium (Magnetic Tape))

The upper limit of the average thickness (average total thickness) $t_T$ of the magnetic tape T is preferably 5.7 μm or less, or 5.2 μm or less, more preferably 5.0 μm or less, still more preferably 4.6 μm or less, and particularly preferably 4.4 μm or less. If the average thickness $t_T$ of the magnetic tape T is 5.2 μm or less, the recording capacity for recording in one data cartridge can be larger than that of a general magnetic tape. The lower limit of the average thickness $t_T$ of the magnetic tape T is not particularly limited, and is, for example, 3.5 μm or more.

The average thickness $t_T$ of the magnetic tape T is determined as follows. First, the magnetic tape T accommodated in the cartridge 10A is unwound, and the magnetic tape T is cut out in a length of 250 mm at a position 30 m from the connection portion between the magnetic tape T and the leader tape LT in the longitudinal direction to prepare a sample. Next, the thickness of the sample is measured at five positions using a laser hologauge (LGH-110C) manufactured by Mitutoyo Corporation as a measuring apparatus, and these measured values are simply averaged (arithmetically averaged) to calculate the average thickness $t_T$ [μm]. Note that the five measurement positions are randomly selected from the sample so as to be different positions in the longitudinal direction of the magnetic tape T.

(Average Thickness of Non-Magnetic Layer (Underlayer))

The average thickness of the non-magnetic layer 12 can be determined as follows. First, the magnetic tape T accommodated in the cartridge 10A is unwound, and the magnetic tape T is cut out in a length of 250 mm at each of three positions 10 m, 30 m, and 50 m, respectively, from the connection portion between the magnetic tape T and the leader tape LT in the longitudinal direction to prepare three samples. Subsequently, each sample is processed with a FIB method or the like to perform thinning. In a case where the FIB method is used, formation of a carbon layer and a tungsten layer as protective films is performed as pre-processing for observing a TEM image of a cross section described below. The carbon layer is formed on a magnetic layer 13 side surface and a back layer 14 side surface of the magnetic tape T with a vapor deposition method, and then the tungsten layer is further formed on the magnetic layer 13 side surface with a vapor deposition method or a sputtering method. The thinning is performed in the longitudinal direction of the magnetic tape T. That is, a cross section parallel to both the longitudinal direction and the thickness direction of the magnetic tape T is formed by the thinning.

The above-described obtained cross section of each thinned sample is observed with a transmission electron microscope (TEM) under the following conditions.

Apparatus: TEM (H9000NAR manufactured by Hitachi, Ltd.)

Acceleration voltage: 300 kV

Magnification: 100,000 times

Next, the thickness of the non-magnetic layer 12 is measured at least 10 positions in the longitudinal direction of the magnetic tape T using the obtained TEM image, and then these measured values are simply averaged (arithmetically averaged) to obtain the average thickness (μm) of the non-magnetic layer 12.

(Average Thickness of Base Layer)

The average thickness of the base layer 11 can be determined as follows. First, the magnetic tape T accommodated in the magnetic recording cartridge 10A is unwound, and the magnetic tape T is cut out in a length of 250 mm at a position 30 m from the connection portion between the magnetic tape T and the leader tape LT in the longitudinal direction to prepare a sample. In the present description, the "longitudinal direction" in the case of "longitudinal direction from a connection portion between a magnetic tape T and a leader tape LT" means a direction from one end on the leader tape LT side toward the other end on the opposite side.

Subsequently, layers other than the base layer 11 of the sample (that is, the non-magnetic layer (underlayer) 12, the magnetic layer 13, and the back layer 14) are removed with a solvent such as methyl ethyl ketone (MEK), dilute hydrochloric acid, or the like. Next, the thickness of the sample (base layer 11) is measured at five positions using a laser hologauge (LGH-110C) manufactured by Mitutoyo Corporation as a measuring apparatus, and these measured values are simply averaged (arithmetically averaged) to calculate the average thickness of the base layer 11. Note that the five measurement positions are randomly selected from the sample so as to be different positions in the longitudinal direction of the magnetic tape T.

(Average Thickness $t_b$ of Back Layer)

The upper limit of the average thickness of the back layer 14 is preferably 0.6 μm or less. If the upper limit of the average thickness of the back layer 14 is 0.6 μm or less, the thicknesses of the non-magnetic layer (underlayer) 12 and the base layer 11 can be kept thick even in a case where the average thickness of the magnetic tape T is 5.6 μm or less, so that the traveling stability of the magnetic tape T in a recording and reproducing apparatus can be maintained. The lower limit of the average thickness of the back layer 14 is not particularly limited, and is, for example, 0.2 μm or more.

The average thickness $t_b$ of the back layer 14 is determined as follows. First, the average thickness (average total thickness) $t_T$ of the magnetic tape T is measured. The method of measuring the average thickness $t_T$ (average total thickness) is as described in the following "average thickness of the magnetic tape". Subsequently, the magnetic tape T accommodated in the cartridge 10A is unwound, and the magnetic tape T is cut out in a length of 250 mm at a position 30 m from the connection portion between the magnetic tape T and the leader tape LT in the longitudinal direction to prepare a sample. Next, the back layer 14 of the sample is removed with a solvent such as methyl ethyl ketone (MEK), dilute hydrochloric acid, or the like. Next, the thickness of the sample is measured at five positions using a laser hologauge (LGH-110C) manufactured by Mitutoyo Corporation, and these measured values are simply averaged (arithmetically averaged) to calculate the average $t_B$ [μm]. Thereafter, the average thickness $t_b$[μm] of the back layer 14 is determined with the following formula. Note that the five measurement positions are randomly selected from the sample so as to be different positions in the longitudinal direction of the magnetic tape T.

$$t_b\ [\mu m] = t_T\ [\mu m] - t_B\ [\mu m]$$

(Average Thickness $t_m$ of Magnetic Layer)

The average thickness $t_m$ of the magnetic layer 13 is determined as follows. First, the magnetic tape T accommodated in the cartridge 10A is unwound, and the magnetic tape T is cut out in a length of 250 mm at each of three positions 10 m, 30 m, and 50 m, respectively, from the connection portion between the magnetic tape T and the leader tape LT in the longitudinal direction to prepare three samples. Subsequently, each sample is processed with a FIB method or the like to perform thinning. In a case where the FIB method is used, formation of a carbon layer and a tungsten layer as protective films is performed as pre-processing for observing a TEM image of a cross section described below. The carbon layer is formed on a magnetic layer 13 side surface and a back layer 14 side surface of the magnetic tape T with a vapor deposition method, and then the tungsten layer is further formed on the magnetic layer 13 side surface with a vapor deposition method or a sputtering method. The thinning is performed in the longitudinal direction of the magnetic tape T. That is, a cross section parallel to both the longitudinal direction and the thickness direction of the magnetic tape T is formed by the thinning.

The above-described obtained cross section of each thinned sample is observed with a transmission electron microscope (TEM) under the following conditions, and thus a TEM image of each thinned sample is obtained. Note that the magnification and the acceleration voltage may be appropriately adjusted according to the type of the apparatus.

Apparatus: TEM (H9000NAR manufactured by Hitachi, Ltd.)

Acceleration voltage: 300 kV

Magnification: 100,000 times

Next, the thickness of the magnetic layer 13 is measured at 10 positions of each thinned sample using the obtained TEM image of each thinned sample. Note that the 10 measurement positions of each thinned sample are randomly selected from the sample so as to be different positions in the longitudinal direction of the magnetic tape T. The average obtained by simply averaging (arithmetically averaging) the obtained measured values of the thinned samples (the thicknesses of the magnetic layer 13 at 30 points in total) is regarded as the average thickness $t_m$ [nm] of the magnetic layer 13.

(Average Particle Size of Magnetic Powder)

In a case where the magnetic powder includes a hexagonal ferrite particle powder, the average particle size and the average aspect ratio of the magnetic powder are determined as follows. First, the magnetic tape T accommodated in the cartridge 10A is unwound, and the magnetic tape T is cut out at a position 30 m from the connection portion between the magnetic tape T and the leader tape LT in the longitudinal direction. Subsequently, the magnetic tape T to be measured is processed with a FIB method or the like to perform thinning. In a case where the FIB method is used, formation of a carbon layer and a tungsten layer as protective films is performed as pre-processing for observing a TEM image of a cross section described below. The carbon layer is formed on a magnetic layer 13 side surface and a back layer 14 side surface of the magnetic tape T with a vapor deposition method, and then the tungsten layer is further formed on the magnetic layer 13 side surface with a vapor deposition method or a sputtering method. The thinning is performed in the length direction (longitudinal direction) of the magnetic tape T. That is, a cross section parallel to both the longitudinal direction and the thickness direction of the magnetic tape T is formed by the thinning.

Using a transmission electron microscope (H-9500 manufactured by Hitachi High-Technologies Corporation), the above-described cross section of the obtained thin piece sample is observed at an acceleration voltage of 200 kV and a total magnification of 500,000 times so that the entire magnetic layer 13 is included in the thickness direction of the magnetic layer 13, and a TEM photo is imaged. The number of TEM photos prepared is such that 50 particles can be extracted in which the plate diameter DB and the plate thickness DA (see FIG. 15) shown below can be measured.

Figure 15:
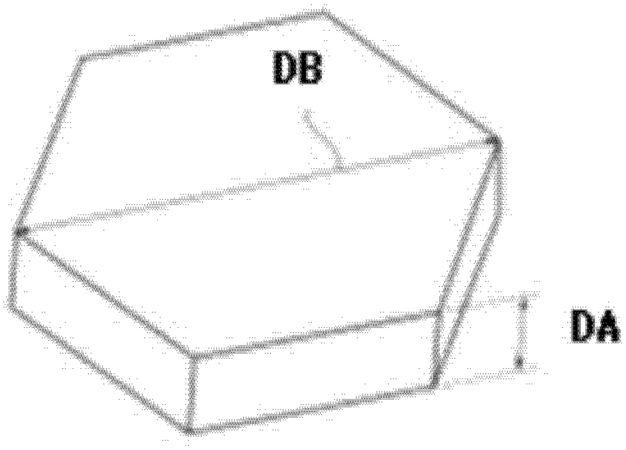
FIG. 15 is a view illustrating an example of a shape of a particle of a magnetic powder.

In the present description, the size of the hexagonal ferrite particle (hereinafter, referred to as "particle size") is determined as follows. In a case where a particle observed in the TEM photo has a plate shape or a columnar shape as illustrated in FIG. 15 (note that the thickness or height is smaller than the long diameter of the plate surface or the bottom surface), the value of the long diameter of the plate surface or the bottom surface is the value of the plate diameter DB. The value of the thickness or height of the particle observed in the TEM photo is the value of the plate thickness DA. In a case where a particle observed in the TEM photo has a hexagonal plate surface or bottom surface, the long diameter means the longest diagonal distance. In a case where the thickness or height of one particle is not constant in the particle, the maximum thickness or height of the particle is the plate thickness DA.

Next, 50 particles to be extracted from the imaged TEM photo are selected according to the following criteria. A particle having a part out of the visual field of the TEM photo is not to be measured, and a particle having a clear outline and existing separately is to be measured. In a case where particles overlap, each particle is to be measured as a single particle when the boundary between the particles is clear and the entire shape of each particle can be determined, but a particle in which the boundary is not clear and the entire shape of the particle cannot be determined is not to be measured as the shape of the particle cannot be determined.

Figure 16:
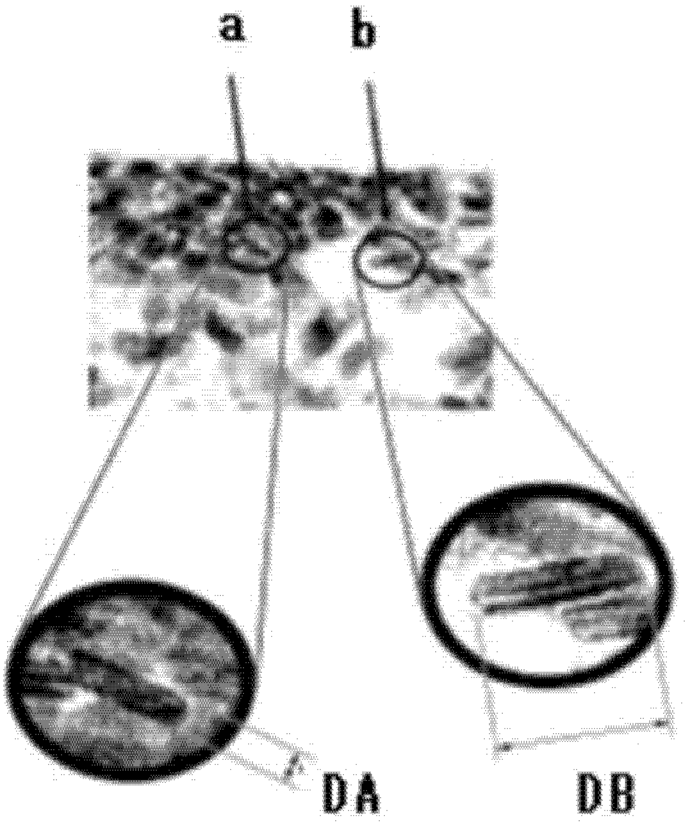
FIG. 16 is an example of a TEM photo of a sample cross section.
Figure 17:
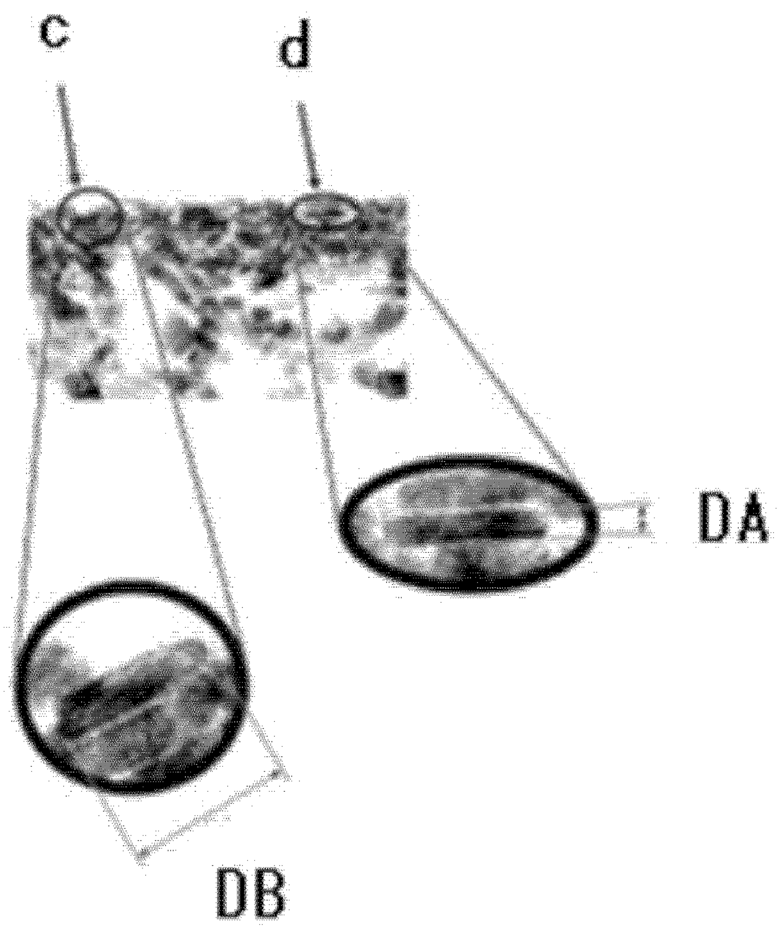
FIG. 17 is another example of a TEM photo of a sample cross section.

FIGS. 16 and 17 show an example of a TEM photo. In FIGS. 16 and 17, for example, the particles indicated by the arrows a and d are selected because the plate thickness of each particle (thickness or height of each particle) DA can be clearly recognized. The plate thickness DA of each of the selected 50 particles is measured. The plate thicknesses DA thus obtained are simply averaged (arithmetically averaged) to obtain an average plate thickness $DA_{ave}$. The average plate thickness $DA_{ave}$ is the average particle plate thickness. Subsequently, the plate diameter DB of each magnetic powder is measured. In order to measure the plate diameter DB of the particles, 50 particles in which the plate diameter DB of each particle can be clearly recognized are selected from the imaged TEM photo. For example, in FIGS. 16 and 17, the particles, for example, indicated by the arrows b and c are selected because the plate diameter DB can be clearly recognized. The plate diameter DB of each of the selected 50 particles is measured. The plate diameters DB thus obtained are simply averaged (arithmetically averaged) to obtain an average plate diameter $DB_{ave}$. The average plate diameter $DB_{ave}$ is an average particle size. Then, the average aspect ratio ($DB_{ave}/DA_{ave}$) of the particles is determined from the average plate thickness $DA_{ave}$ and the average plate diameter $DB_{ave}$.

(Average Particle Volume of Magnetic Powder)

The average particle volume of the magnetic powder is determined as follows. First, as described regarding the method of calculating the average particle size of the magnetic powder, the average plate thickness $DA_{ave}$ and the average plate diameter $DB_{ave}$ are determined. Next, the average particle volume V of the magnetic powder is determined with the following formula.

$$V = \frac{3\sqrt{3}}{8} \times DA_{ave} \times DB_{ave} \times DB_{ave} \quad \text{[Math. 1]}$$

(Squareness Ratio Rs2 in Vertical Direction)

The squareness ratio Rs2 of the magnetic recording medium of the present technology in the vertical direction (thickness direction) can be preferably 65% or more, more preferably 67% or more, and still more preferably 70% or more. If the squareness ratio Rs2 is 65% or more, the vertical orientation of the magnetic powder is sufficiently high, so that a more excellent SNR can be obtained. Therefore, a more excellent electromagnetic conversion characteristic can be obtained. Furthermore, the servo signal shape is improved, and control on the drive side is more easily performed.

In the present description, the vertical orientation of the magnetic recording medium may mean that the squareness ratio Rs2 of the magnetic recording medium is within the above numerical range (for example, 65% or more).

The squareness ratio Rs2 in the vertical direction is determined as follows. First, the magnetic tape T accommodated in the magnetic recording cartridge 10A is unwound, and the magnetic tape T is cut out in a length of 250 mm at a position 30 m from the connection portion between the magnetic tape T and the leader tape LT in the longitudinal direction to prepare a sample. The sample is punched into 6.25 mm×64 mm, and then folded in three to prepare a measurement sample of 6.25 mm×8 mm. Then, the M-H hysteresis loop of the measurement sample (the entire magnetic tape T) corresponding to the vertical direction (thickness direction) of the magnetic tape T is measured using a VSM. Next, the coating film (the underlayer 12, the magnetic layer 13, the back layer 14, and the like) are wiped using acetone, ethanol, or the like, and only the base layer 11 is left. Then, the obtained base layer 11 is punched into 6.25 mm×64 mm, and then folded in three to obtain a sample of 6.25 mm×8 mm for background correction (hereinafter, simply referred to as "sample for correction"). Thereafter, the M-H hysteresis loop of the sample for correction (base layer 11) corresponding to the vertical direction of the base layer 11 (vertical direction of the magnetic recording medium 10) is measured using a VSM.

In the measurement of the M-H hysteresis loop of the measurement sample (the entire magnetic tape T) and the M-H hysteresis loop of the sample for correction (base layer 11), a high-sensitivity vibrating sample magnetometer "model VSM-P7-15" manufactured by Toei Industry Co., Ltd. is used. The measurement conditions are as follows: measurement mode: full loop, maximum magnetic field: 15 kOe, magnetic field step: 40 bits, time constant of locking amp: 0.3 sec, waiting time: 1 sec, and MH average number: 20.

After obtaining the M-H hysteresis loop of the measurement sample (the entire magnetic tape T) and the M-H hysteresis loop of the sample for correction (base layer 11), the M-H hysteresis loop of the sample for correction (base layer 11) is subtracted from the M-H hysteresis loop of the measurement sample (the entire magnetic tape T) to perform background correction, and an M-H hysteresis loop after background correction is obtained. For calculation of the background correction, a measurement/analysis program attached to "model VSM-P7-15" is used.

The saturation magnetization amount Ms (emu) and the residual magnetization Mr (emu) of the obtained M-H hysteresis loop after background correction are substituted in the following formula to calculate the squareness ratio Rs2 (%). Note that every measurement of the M-H hysteresis loop described above is performed at 25° C. Furthermore, when the M-H hysteresis loop is measured in the vertical direction of the magnetic tape T, "demagnetizing field correction" is not performed. Note that for this calculation, a measurement/analysis program attached to "model VSM-P7-15" is used.

$$\text{Squareness ratio } Rs2\ (\%) = (Mr/Ms) \times 100$$

(4) Method of Manufacturing Magnetic Recording Medium

Next, a method of manufacturing the magnetic recording medium 10 having the above-described configuration will be described. First, a non-magnetic powder, a binder, and the like are kneaded and/or dispersed in a solvent to prepare a coating material for forming a non-magnetic layer (underlayer). Next, a magnetic powder, a binder, and the like are kneaded and/or dispersed in a solvent to prepare a coating material for forming a magnetic layer. For the preparation of the coating material for forming a magnetic layer and the coating material for forming a non-magnetic layer (underlayer), for example, the following solvents, dispersing apparatus, and kneading apparatus can be used.

Examples of the solvent used in the preparation of the coating material described above include ketone-based solvents such as acetone, methyl ethyl ketone, methyl isobutyl ketone, cyclohexanone, and the like, alcohol-based solvents such as methanol, ethanol, propanol, and the like, ester-based solvents such as methyl acetate, ethyl acetate, butyl acetate, propyl acetate, ethyl lactate, ethylene glycol acetate, and the like, ether-based solvents such as diethylene glycol dimethyl ether, 2-ethoxyethanol, tetrahydrofuran, dioxane, and the like, aromatic hydrocarbon-based solvents such as benzene, toluene, xylene, and the like, and halogenated hydrocarbon-based solvents such as methylene chloride, ethylene chloride, carbon tetrachloride, chloroform, chlorobenzene, and the like. One of these solvents may be used, or a mixture of two or more thereof may be used.

As the kneading apparatus used in the preparation of the coating material described above, for example, a kneading apparatus can be used such as a continuous biaxial kneader, a continuous biaxial kneader capable of diluting in multiple steps, a kneader, a press kneader, a roll kneader, or the like, but the kneading apparatus is not particularly limited thereto. Furthermore, as the dispersing apparatus used in the preparation of the coating material described above, for example, a dispersing apparatus can be used such as a roll mill, a ball mill, a horizontal sand mill, a vertical sand mill, a spike mill, a pin mill, a tower mill, a pearl mill (for example, "DCP Mill" manufactured by Nippon Eirich Co., Ltd., or the like), a homogenizer, an ultrasonic dispersing apparatus, or the like, but the dispersing apparatus is not particularly limited thereto.

Next, the coating material for forming a non-magnetic layer (underlayer) is applied to one principal plane of a base layer 11 and dried to form a non-magnetic layer 12. Subsequently, the coating material for forming a magnetic layer is applied onto the non-magnetic layer 12 and dried to form a magnetic layer 13 on the non-magnetic layer 12. Note that, at the time of drying, the magnetic powder is magnetically oriented in the thickness direction of the base layer 11 with, for example, a solenoid coil. Furthermore, at the time of drying, for example, the magnetic powder may be magnetically oriented in the longitudinal direction (traveling direction) of the base layer 11 and then magnetically oriented in the thickness direction of the base layer 11 with a solenoid coil. By performing such magnetic orientation processing, the ratio Hc2/Hc1 of the holding force "Hc2" in the longitudinal direction to the holding force "Hc1" in the vertical direction can be reduced, and the degree of vertical orientation of the magnetic powder can be improved. After forming the magnetic layer 13, a back layer 14 is formed on the other principal plane of the base layer 11. Thus, a magnetic recording medium 10 is obtained.

The ratio Hc2/Hc1 is, for example, set to a desired value by adjusting the strength of the magnetic field applied to the coating film of the coating material for forming a magnetic layer, the concentration of the solid content in the coating material for forming a magnetic layer, and drying conditions of the coating film of the coating material for forming a magnetic layer (the drying temperature and the drying time). The strength of the magnetic field applied to the coating film is preferably 2 times or more and 3 times or less the holding force of the magnetic powder. In order to further increase the ratio Hc2/Hc1, it is also preferable to magnetize the magnetic powder at a stage before the coating material for forming a magnetic layer is put in an orienting apparatus for magnetically orienting the magnetic powder. Note that methods of adjusting the ratio Hc2/Hc1 may be used alone or in combination of two or more thereof.

Thereafter, the obtained magnetic recording medium 10 is rewound around a large-diameter core, and curing processing is performed. Finally, the magnetic recording medium 10 is calendered and then cut into a predetermined width (for example, a width of ½ inches). Thus, a target elongated magnetic recording medium 10 is obtained.

(5) Recording and Reproducing Apparatus

[Configuration of Recording and Reproducing Apparatus]

Next, an example of a configuration of a recording and reproducing apparatus 30 that performs recording and reproducing of the magnetic recording medium 10 having the above-described configuration will be described with reference to FIG. 2.

The recording and reproducing apparatus 30 has a configuration in which the tension applied to the magnetic recording medium 10 in the longitudinal direction can be adjusted. Furthermore, the recording and reproducing apparatus 30 has a configuration in which a magnetic recording cartridge 10A can be loaded. Here, in order to make the description easy, a case is described in which the recording and reproducing apparatus 30 has a configuration in which one magnetic recording cartridge 10A can be loaded, but the recording and reproducing apparatus 30 may have a configuration in which a plurality of magnetic recording cartridges 10A can be loaded.

The recording and reproducing apparatus 30 is preferably a timing servo type magnetic recording and reproducing apparatus. The magnetic recording medium of the present technology is suitable for use in a timing servo type magnetic recording and reproducing apparatus.

The recording and reproducing apparatus 30 is connected to information processors such as a server 41, a personal computer (hereinafter referred to as "PC") 42, and the like via a network 43, and is configured to be capable of recording data supplied from the information processors in the magnetic recording cartridge 10A. The shortest recording wavelength of the recording and reproducing apparatus 30 is preferably 100 nm or less, more preferably 75 nm or less, still more preferably 60 nm or less, and particularly preferably 50 nm or less.

Figure 2:
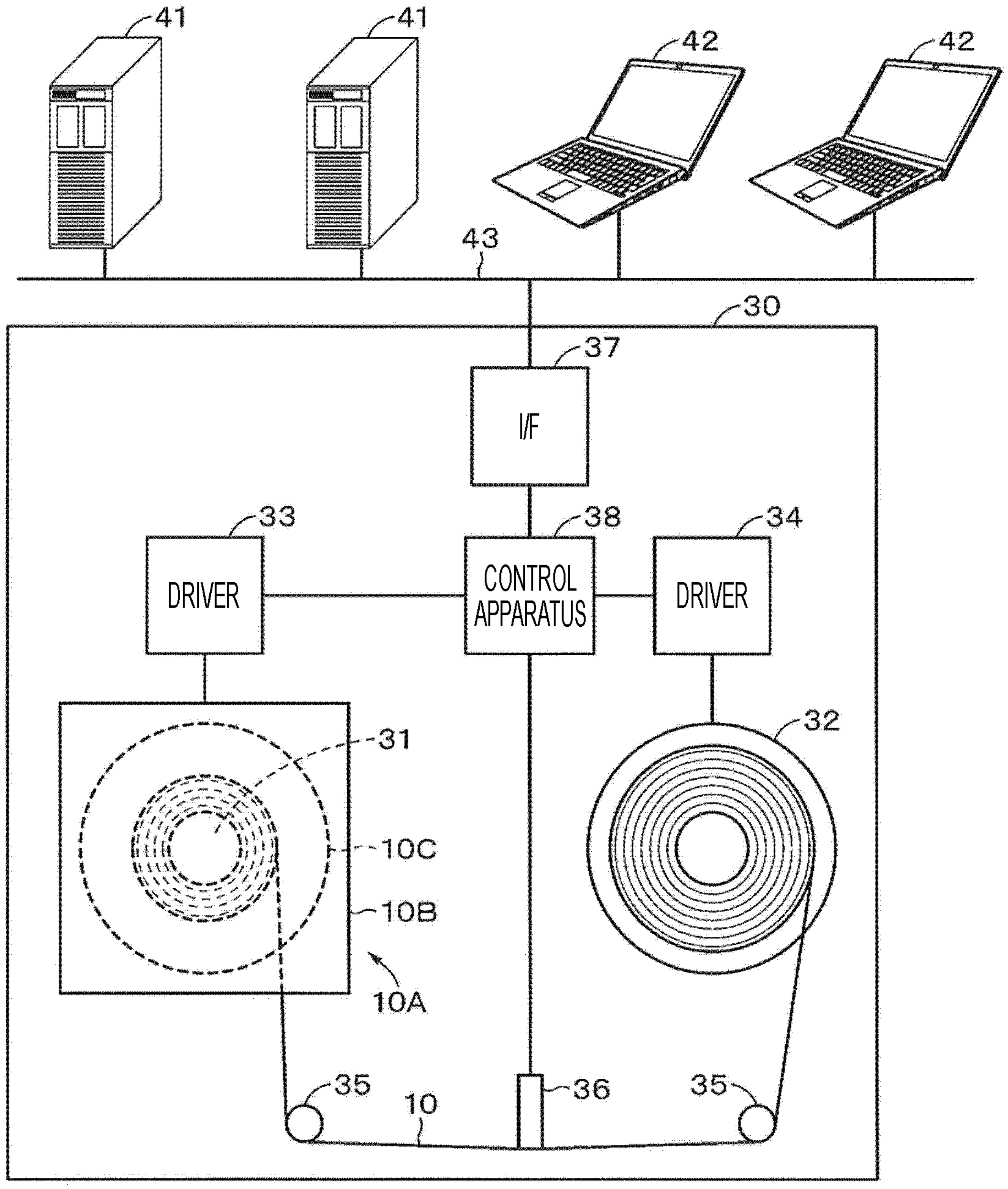
FIG. 2 is a schematic view illustrating a configuration of a recording and reproducing apparatus.

As illustrated in FIG. 2, the recording and reproducing apparatus includes a spindle 31, a reel 32 on the recording and reproducing apparatus side, a spindle driver 33, a reel driver 34, a plurality of guide rollers 35, a head unit 36, a communication interface (hereinafter, I/F) 37, and a control apparatus 38.

The spindle 31 is configured so that the magnetic recording cartridge 10A can be loaded thereon. The magnetic recording cartridge 10A conforms to the Linear Tape-Open (LTO) standard and includes a cartridge case 10B accommodating a rotatable single reel 10C in which the magnetic recording medium 10 is wound. In the magnetic recording medium 10, a servo pattern in an inverted V-shape is recorded in advance as a servo signal. The reel 32 is configured to be capable of fixing a leading end of the magnetic recording medium 10 drawn out from the magnetic recording cartridge 10A.

The present technology also provides a magnetic recording cartridge including the magnetic recording medium according to the present technology. In the magnetic recording cartridge, the magnetic recording medium may be wound around, for example, a reel.

The spindle driver 33 is an apparatus that rotationally drives the spindle 31. The reel driver 34 is an apparatus that rotationally drives the reel 32. When the data is recorded in or reproduced from the magnetic recording medium 10, the spindle driver 33 and the reel driver 34 rotationally drive the spindle 31 and the reel 32, respectively, to allow the magnetic recording medium 10 to travel. The guide rollers 35 are a roller for guiding travel of the magnetic recording medium 10.

The head unit 36 includes a plurality of recording heads for recording data signals in the magnetic recording medium 10, a plurality of reproducing heads for reproducing the data signals recorded in the magnetic recording medium 10, and a plurality of servo heads for reproducing the servo signals recorded in the magnetic recording medium 10. As the recording head, for example, a ring head can be used, but the type of the recording head is not limited thereto.

The communication I/F 37 is for communicating with the information processors such as the server 41, the PC 42, and the like, and is connected to the network 43.

The control apparatus 38 controls a whole of the recording and reproducing apparatus 30. For example, in response to a request from the information processors such as the server 41, the PC 42, and the like, the control apparatus 38 records the data signal supplied from the information processor in the magnetic recording medium 10 by the head unit 36. Furthermore, in response to a request from the information processors such as the server 41, the PC 42, and the like, the control apparatus 38 reproduces the data signal recorded in the magnetic recording medium 10 by the head unit 36 and supplies the data signal to the information processor.

Furthermore, the control apparatus 38 detects a change in the width of the magnetic recording medium 10 on the basis of a servo signal supplied from the head unit 36. Specifically, a plurality of servo patterns in an inverted V-shape is recorded as servo signals in the magnetic recording medium 10, and the head unit 36 can simultaneously reproduce two different servo patterns by two servo heads on the head unit 36 to obtain respective servo signals. Using the relative position information between the servo pattern and the head unit obtained from the servo signal, the position of the head unit 36 is controlled so as to follow the servo pattern. At the same time, two servo signal waveforms are compared, and thus the distance information between the servo patterns can also be obtained. The distance information between servo patterns obtained at the time of each measurement are compared, and thus a change in the distance between servo patterns at the time of each measurement can be obtained. To the obtained change, the distance information between servo patterns at the time of recording the servo patterns is added, and thus a change in the width of the magnetic recording medium 10 can also be calculated. The control apparatus 38 controls rotational driving of the spindle driver 33 and the reel driver 34 on the basis of the change in the distance between servo patterns obtained as described above or the calculated change in the width of the magnetic recording medium 10, and adjusts the tension of the magnetic recording medium 10 in the longitudinal direction so that the magnetic recording medium 10 has a prescribed width or a substantially prescribed width. Thus, a change in the width of the magnetic recording medium 10 can be suppressed.

[Operation of Recording and Reproducing Apparatus]

Next, an operation of the recording and reproducing apparatus 30 having the above configuration will be described.

First, the magnetic recording cartridge 10A is loaded in the recording and reproducing apparatus 30, a leading end of the magnetic recording medium 10 is drawn out and transferred to the reel 32 via the plurality of guide rollers 35 and the head unit 36, and the leading end of the magnetic recording medium 10 is attached to the reel 32.

Next, when an operation unit (not illustrated) is operated, the spindle driver 33 and the reel driver 34 are driven by control of the control apparatus 38, and the spindle 31 and the reel 32 are rotated in the same direction so that the magnetic recording medium 10 travels from the reel 10C toward the reel 32. As a result, while the magnetic recording medium 10 is wound around the reel 32, the head unit 36 records information in the magnetic recording medium 10 or reproduces the information recorded in the magnetic recording medium 10.

Furthermore, when the magnetic recording medium 10 is rewound around the reel 10C, the spindle 31 and the reel 32 are rotationally driven in the direction opposite to the above direction, and thus the magnetic recording medium 10 travels from the reel 32 to the reel 10C. Also at the time of rewinding, the head unit 36 records information in the magnetic recording medium 10 or reproduces the information recorded in the magnetic recording medium 10.

(6) Modified Examples

Modified Example 1

Figure 3:
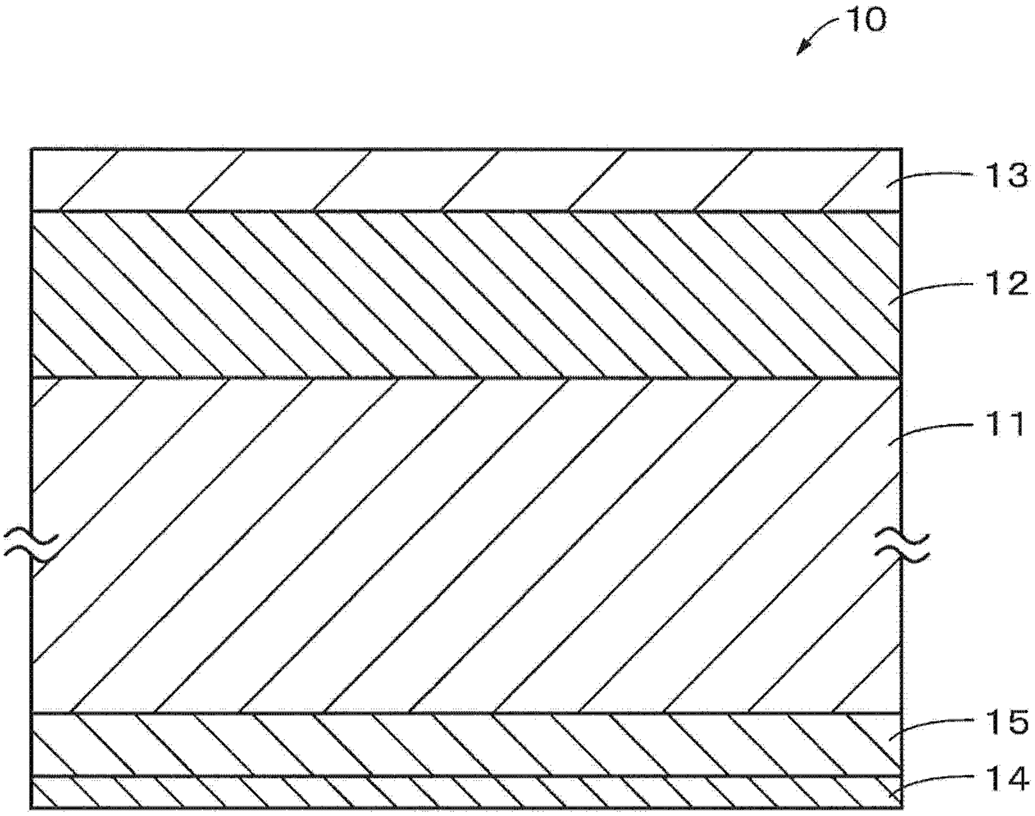
FIG. 3 is a cross-sectional view illustrating a configuration of a magnetic recording medium in a modified example.

The magnetic recording medium 10 may further include a barrier layer 15 provided on at least one surface of the base layer 11 as illustrated in FIG. 3. The barrier layer 15 is a layer for suppressing dimensional deformation of the base layer 11 according to the environment. For example, the hygroscopicity of the base layer 11 is one of examples of the cause of the dimensional deformation, and the barrier layer 15 can reduce the penetration speed of moisture into the base layer 11. The barrier layer 15 contains a metal or a metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta can be used. As the metal oxide, for example, at least one of $Al_2O_3$, CuO, CoO, $SiO_2$, $Cr_2O_3$, $TiO_2$, $Ta_2O_5$, or $ZrO_2$ can be used, and any of oxides of the above-described metals can also be used. Furthermore, diamond-like carbon (DLC), diamond, or the like can be used.

The average thickness of the barrier layer 15 is preferably 20 nm or more and 1000 nm or less, and more preferably 50 nm or more and 1000 nm or less. The average thickness of the barrier layer 15 is determined in a manner similar to that for determination of the average thickness $t_m$ of the magnetic layer 13. However, the magnification of the TEM image is appropriately adjusted according to the thickness of the barrier layer 15.

Modified Example 2

The magnetic recording medium 10 may be incorporated in a library apparatus. That is, the present technology also provides a library apparatus including at least one magnetic recording medium 10. The library apparatus has a configuration capable of adjusting the tension applied to the magnetic recording medium 10 in the longitudinal direction, and may include a plurality of the above-described recording and reproducing apparatus 30.

Modified Example 3

The magnetic recording medium 10 may be subjected to servo signal write processing by a servo writer. The servo writer adjusts the tension of the magnetic recording medium 10 in the longitudinal direction at the time of, for example, recording a servo signal, and thus the width of the magnetic recording medium 10 can be kept constant or substantially constant. In this case, the servo writer can include a detector that detects the width of the magnetic recording medium 10. The servo writer can adjust the tension of the magnetic recording medium 10 in the longitudinal direction on the basis of the detection result by the detector.

3. Second Embodiment (1) Embodiment of Magnetic Recording Cartridge

[Configuration of Cartridge]

The present technology also provides a magnetic recording cartridge (also referred to as a tape cartridge) including the magnetic recording medium according to the present technology. In the magnetic recording cartridge, the magnetic recording medium may be wound around, for example, a reel. The magnetic recording cartridge may include, for example, a communication unit that communicates with a recording and reproducing apparatus, a storage unit, and a control unit that stores information received from the recording and reproducing apparatus via the communication unit in the storage unit, reads the information from the storage unit in response to a request from the recording and reproducing apparatus, and transmits the information to the recording and reproducing apparatus via the communication unit. The information may include adjustment information for adjusting the tension applied to the magnetic recording medium in the longitudinal direction.

An example of a configuration of a magnetic recording cartridge 10A including the magnetic recording medium T having the above-described configuration will be described with reference to FIG. 4.

Figure 4:
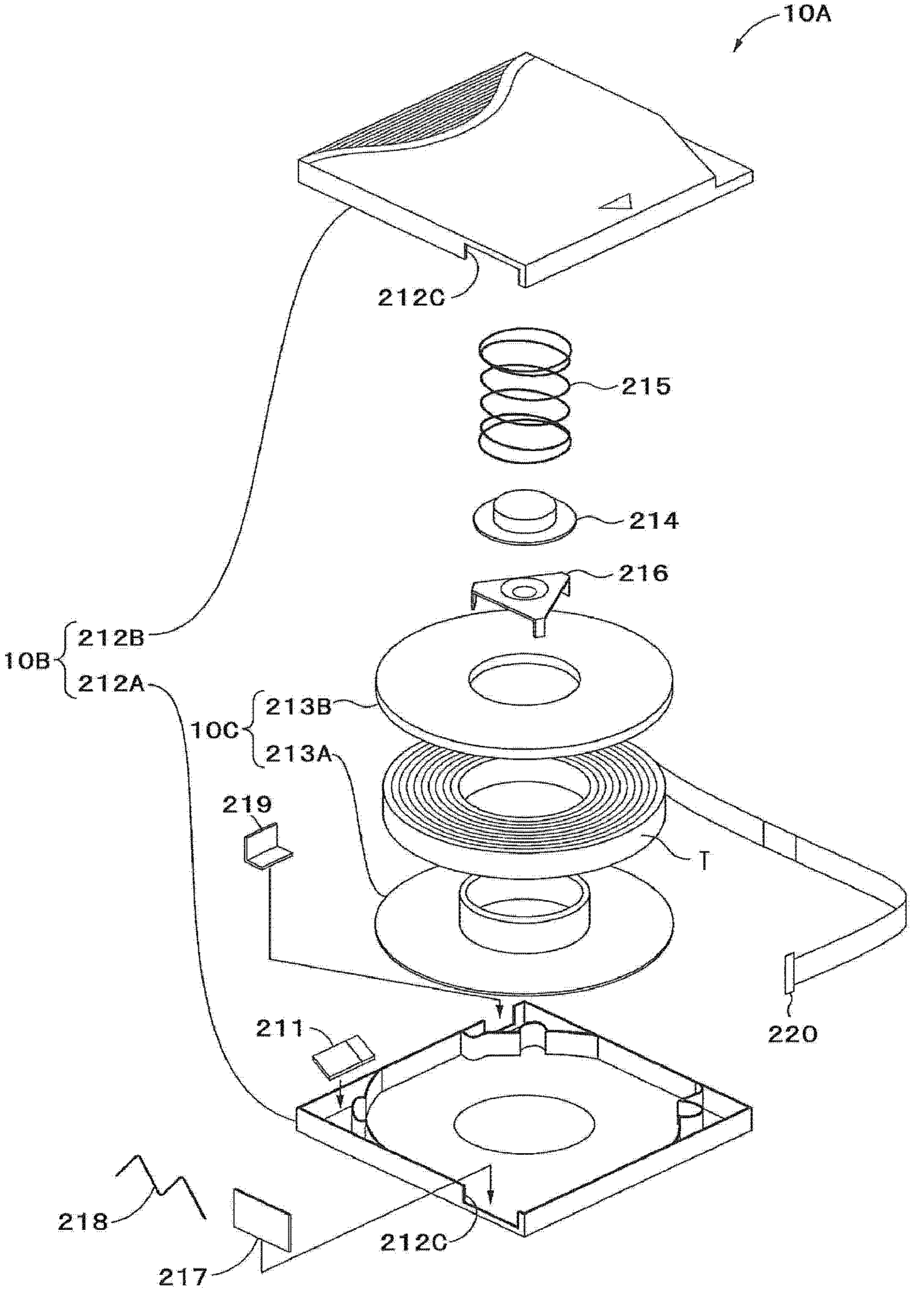
FIG. 4 is an exploded perspective view illustrating an example of a configuration of a magnetic recording cartridge.

FIG. 4 is an exploded perspective view illustrating an example of a configuration of a magnetic recording cartridge 10A. The magnetic recording cartridge 10A is a magnetic recording cartridge conforming to the Linear Tape-Open (LTO) standard, and includes, inside a cartridge case 10B including a lower shell 212A and an upper shell 212B, a reel 10C in which a magnetic tape (tape-shaped magnetic recording medium) T is wound, a reel lock 214 and a reel spring 215 for locking rotation of the reel 10C, a spider 216 for unlocking the locking state of the reel 10C, a slide door 217 for opening and closing a tape outlet 212C provided in the cartridge case 10B across the lower shell 212A and the upper shell 212B, a door spring 218 for energizing the slide door 217 to the closed position of the tape outlet 212C, a write protect 219 for preventing erroneous erasure, and a cartridge memory 211. The reel 10C has a substantially disk shape having an opening at the center portion, and includes a reel hub 213A and a flange 213B made of a hard material such as plastic and the like. A leader tape LT is connected to one end portion of the magnetic tape T. A leader pin 220 is provided at a leading end of the leader tape LT.

The cartridge memory 211 is provided in the vicinity of one corner of the magnetic recording cartridge 10A. In a state where the magnetic recording cartridge 10A is loaded in a recording and reproducing apparatus 80, the cartridge memory 211 faces a reader/writer (not illustrated) of the recording and reproducing apparatus 80. The cartridge memory 211 communicates with a recording and reproducing apparatus 30, specifically, a reader/writer (not illustrated) in accordance with a wireless communication standard based on the LTO standard.

[Configuration of Cartridge Memory]

An example of a configuration of the cartridge memory 211 will be described with reference to FIG. 5.

Figure 5:
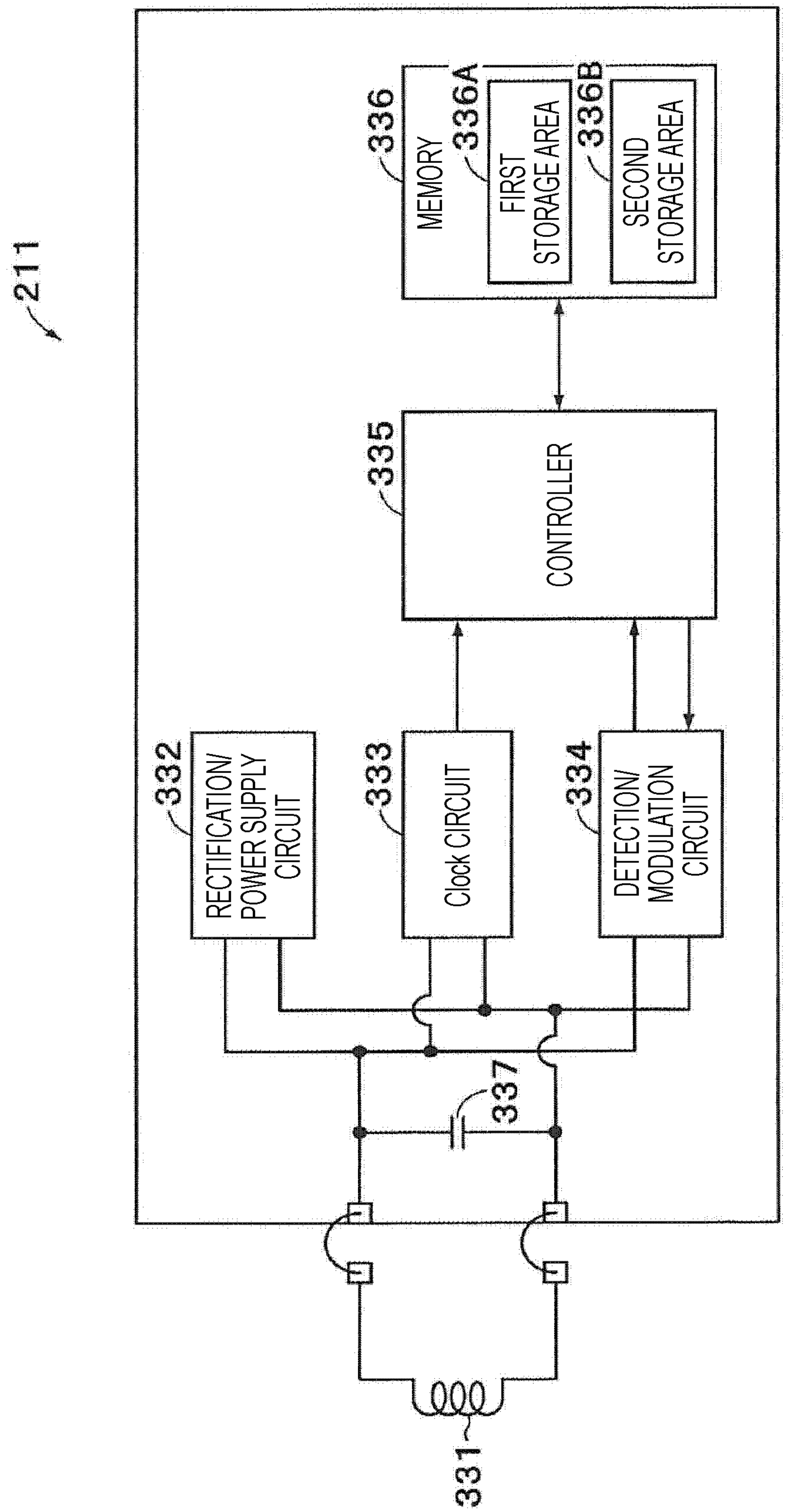
FIG. 5 is a block diagram illustrating an example of a configuration of a cartridge memory.

FIG. 5 is a block diagram illustrating an example of a configuration of the cartridge memory 211. The cartridge memory 211 includes an antenna coil (communication unit) 331 that communicates with a reader/writer (not illustrated) in accordance with a prescribed communication standard, a rectification/power supply circuit 332 that generates and rectifies a power to generate a power supply using an induced electromotive force from a radio wave received by the antenna coil 331, a clock circuit 333 that generates a clock similarly using the induced electromotive force from the radio wave received by the antenna coil 331, a detection/modulation circuit 334 that detects the radio wave received by the antenna coil 331 and modulates a signal to be transmitted by the antenna coil 331, a controller (control unit) 335 including a logic circuit and the like for discriminating commands and data from digital signals extracted from the detection/modulation circuit 334 and processing the commands and the data, and a memory (storage unit) 336 that stores information. Furthermore, the cartridge memory 211 includes a capacitor 337 connected in parallel to the antenna coil 331 to configure a resonance circuit with the antenna coil 331 and the capacitor 337.

The memory 336 stores information and the like relating to the magnetic recording cartridge 10A. The memory 336 is a non volatile memory (NVM). The memory 336 preferably has a storage capacity of about 32 KB or more. For example, in a case where the magnetic recording cartridge 10A conforms to the next generation or later LTO format standard, the memory 336 has a storage capacity of about 32 KB.

The memory 336 includes a first storage area 336A and a second storage area 336B. The first storage area 336A corresponds to a storage area of a cartridge memory of an LTO standard prior to LTO 8 (hereinafter, referred to as a "conventional cartridge memory"), and is an area for storing information conforming to the LTO standard prior to LTO8. The information conforming to the LTO standard prior to LTO8 is, for example, manufacturing information (for example, a unique number of the magnetic recording cartridge 10A, or the like), a use history (for example, the number of times of tape withdrawal (thread count), or the like), and the like.

The second storage area 336B corresponds to an extended storage area with respect to a storage area of a conventional cartridge memory. The second storage area 336B is an area for storing additional information. Here, the additional information means information, relating to the magnetic recording cartridge 10A, that is not prescribed in the LTO standard prior to LTO8. Examples of the additional information include, but are not limited to, data such as tension adjustment information, management ledger data, index information, thumbnail information of a moving image stored in the magnetic tape T, and the like. The tension adjustment information includes the distance between adjacent servo bands (the distance between servo patterns recorded in adjacent servo bands) at the time of recording data in the magnetic tape T. The distance between adjacent servo bands is an example of width-related information relating to the width of the magnetic tape T. Details of the distance between servo bands will be described below. In the following description, the information stored in the first storage area 336A may be referred to as "first information", and the information stored in the second storage area 336B may be referred to as "second information".

The memory 336 may have a plurality of banks. In this case, some of the plurality of banks may constitute the first storage area 336A, and the remaining banks may constitute the second storage area 336B. Specifically, for example, in a case where the magnetic recording cartridge 10A conforms to the next generation or later LTO format standard, the memory 336 may include two banks having a storage capacity of about 16 KB, one of the two banks may constitute the first storage area 336A, and the other bank may constitute the second storage area 336B.

The antenna coil 331 induces an induced voltage by electromagnetic induction. The controller 335 communicates with the recording and reproducing apparatus 80 in accordance with a prescribed communication standard via the antenna coil 331. Specifically, for example, mutual authentication, command transmission/reception, data exchange, and the like are performed.

The controller 335 stores the information received from the recording and reproducing apparatus 80 via the antenna coil 331 in the memory 336. In response to a request from the recording and reproducing apparatus 80, the controller 335 reads information from the memory 336 and transmits the information to the recording and reproducing apparatus 80 via the antenna coil 331.

(2) Modified Example of Magnetic Recording Cartridge

[Configuration of Cartridge]

In one embodiment of the magnetic recording cartridge described above, a case where the magnetic tape cartridge is a one-reel cartridge is described, but the magnetic recording cartridge of the present technology may be a two-reel cartridge. That is, the magnetic recording cartridge of the present technology may have one or a plurality of (for example, two) reels around which the magnetic tape is wound. Hereinafter, an example of the magnetic recording cartridge of the present technology having two reels will be described with reference to FIG. 6.

Figure 6:
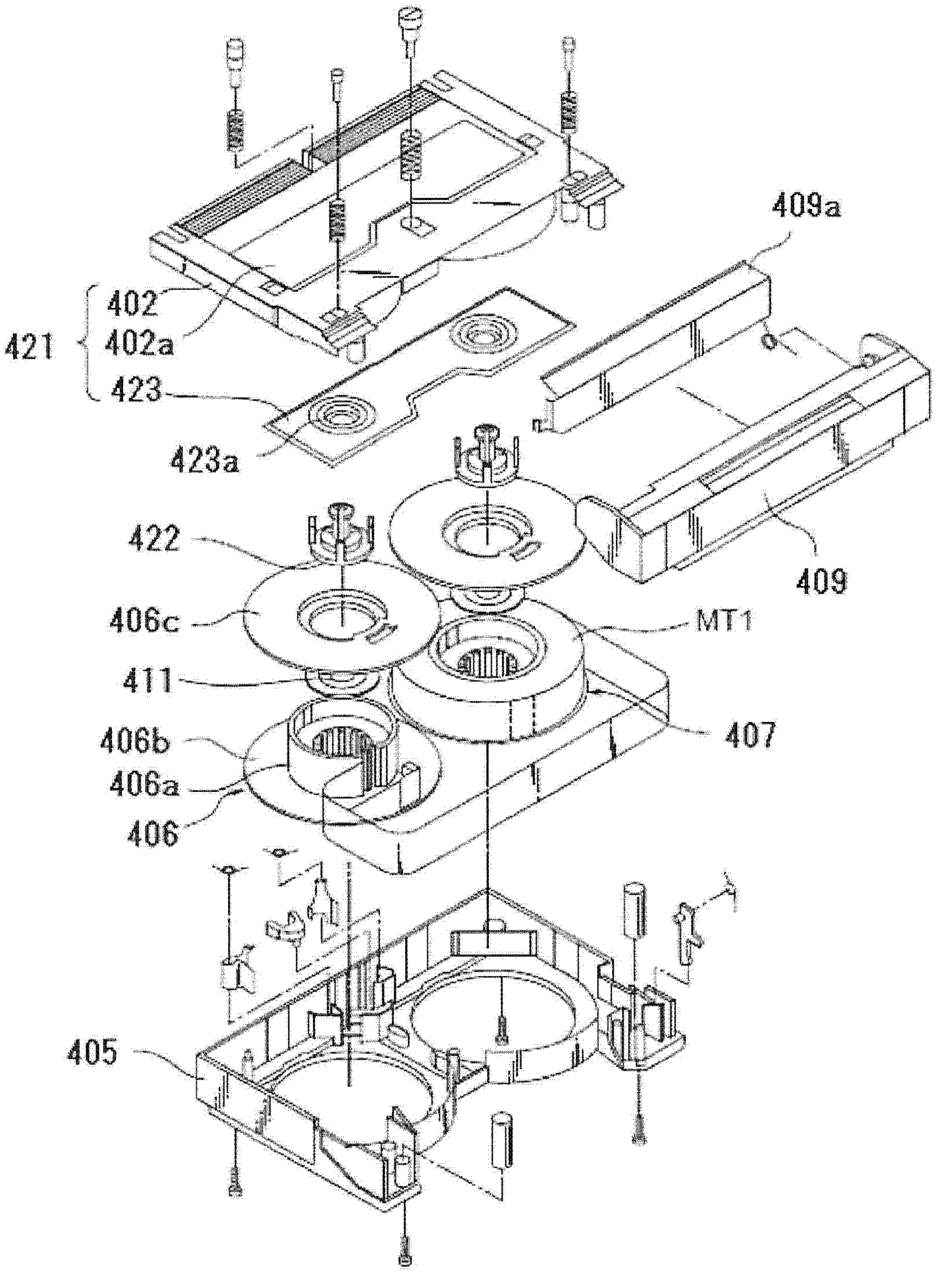
FIG. 6 is an exploded perspective view illustrating an example of a configuration of a magnetic recording cartridge of a modified example.

FIG. 6 is an exploded perspective view illustrating an example of a configuration of a two-reel cartridge 421. The cartridge 421 includes an upper half 402 including a synthetic resin, a transparent window member 423 fitted and fixed to a window portion 402*a* opened in an upper surface of the upper half 402, reel holders 422 fixed to an inner side of the upper half 402 and preventing uplift of reels 406 and 407, a lower half 405 corresponding to the upper half 402, the reels 406 and 407 stored in a space formed by combining the upper half 402 and the lower half 405, a magnetic tape MT1 wound around the reels 406 and 407, a front lid 409 closing a front side opening formed by combining the upper half 402 and the lower half 405, and a back lid 409A protecting the magnetic tape MT1 exposed at the front side opening.

The reel 406 includes a lower flange 406*b* having a cylindrical hub portion 406*a*, in a central portion, around which the magnetic tape MT1 is wound, an upper flange 406*c* having substantially the same size as the lower flange 406*b*, and a reel plate 411 interposed between the hub portion 406*a* and the upper flange 406*c*. The reel 407 has a configuration similar to that of the reel 406.

The window member 423 is provided with attachment holes 423*a* at positions corresponding to the reels 406 and 407, respectively, for assembling the reel holders 422 as reel holding units that prevent the reels from being lifted up. The magnetic tape MT1 is similar to the magnetic tape T in the first embodiment.

The present technology can also employ the following configurations.

[1]

A magnetic recording medium including a magnetic layer containing a magnetic powder, the magnetic layer containing first particles having conductivity and second particles having a Mohs hardness of 7 or more, the first particles and the second particles forming protrusions on a surface on a side of the magnetic layer, the second particles forming protrusions having an average height (H2) of 7 nm or less on the surface on the side of the magnetic layer, the magnetic recording medium containing a fatty acid, the magnetic recording medium having an extraction rate of the fatty acid of 45% or more, the extraction rate defined by a formula described below.

$$\text{Extraction rate of fatty acid (\%)} = [\text{amount of fatty acid extracted in 5 minutes (mg/m}^2)/\text{total amount of fatty acid extracted (mg/m}^2)] \times 100$$

[2]

The magnetic recording medium according to [1], in which an amount of the fatty acid extracted in 5 minutes (mg/m$^2$) is 3.0 mg/m$^2$ or more.

[3]

The magnetic recording medium according to [1] or [2], in which a total amount of the fatty acid extracted (mg/m$^2$) is 5.0 mg/m$^2$ or more.

[4]

The magnetic recording medium according to any one of [1] to [3], in which the fatty acid includes stearic acid.

[5]

The magnetic recording medium according to any one of [1] to [4], further containing a fatty acid ester, and having an extraction rate of the fatty acid ester of 60% or more, the extraction rate defined by a formula described below.

$$\text{Extraction rate of fatty acid ester (\%)} = [\text{amount of fatty acid ester extracted in 5 minutes (mg/m}^2)/\text{total amount of fatty acid ester extracted (mg/m}^2)] \times 100$$

[6]

The magnetic recording medium according to [5], in which an amount of the fatty acid ester extracted in 5 minutes (mg/m$^2$) is 10.0 mg/m$^2$ or more.

[7]

The magnetic recording medium according to [5] or [6], in which a total amount of the fatty acid ester extracted (mg/m$^2$) is 12.0 mg/m$^2$ or more.

[8]

The magnetic recording medium according to any one of [5] to [7], in which the fatty acid ester includes butyl stearate.

[9]

The magnetic recording medium according to any one of [1] to [8], in which the magnetic layer has an average thickness of 0.08 μm or less.

[10]

The magnetic recording medium according to any one of [1] to [9], further including a non-magnetic layer.

[11]

The magnetic recording medium according to [10], in which the non-magnetic layer has an average thickness of 1.2 μm or less.

[12]

The magnetic recording medium according to any one of [1] to [11], having an average thickness (average total thickness) of 5.7 μm or less.

[13]

The magnetic recording medium according to any one of [1] to [12], in which the magnetic powder has a surface covered with a covering agent.

[14]

The magnetic recording medium according to [13], in which the covering agent includes an organic acid.

[15]

The magnetic recording medium according to any one of [1] to [14], in which the second particles include inorganic particles.

[16]

The magnetic recording medium according to any one of [1] to [15], in which the second particles include alumina particles.

[17]

A magnetic recording cartridge including the magnetic recording medium according to any one of [1] to [16] in a state of being wound around a reel, the magnetic recording medium accommodated in a case.

4. Examples

Hereinafter, the present technology will be described specifically with reference to Examples, but the present technology is not limited only to these Examples.

In the present Example, the average height of the protrusions formed by the second particles (referred to as AFM protrusion average height in Table 1), the extraction rate of the fatty acid, the amount of the fatty acid extracted in 5 minutes, the total amount of the fatty acid extracted, the extraction rate of the fatty acid ester, the amount of the fatty acid ester extracted in 5 minutes, the total amount of the fatty acid ester extracted, the average thickness (average total thickness) $t_T$ of the magnetic tape, the average thickness $t_m$ of the magnetic layer, the average thickness of the non-magnetic layer (underlayer), the average thickness of the base layer, the average thickness of the back layer, the deposit, and the deterioration of output were determined with the measurement methods described in an embodiment described above.

Example 1

(Step of Preparing Coating Material for Forming Magnetic Layer)

A coating material for forming a magnetic layer was prepared as follows. First, a first composition having the following formulation was kneaded with an extruder. Next, the kneaded first composition and a second composition having the following formulation were added to a stirring tank equipped with a disperser, and premixing was performed. Subsequently, sand mill mixing was further performed, and filter treatment was performed to prepare a coating material for forming a magnetic layer.

(First Composition)

Magnetic powder (hexagonal ferrite having M-type structure, composition: Ba-ferrite, shape: plate-shaped hexagonal particles, average particle volume: 1600 $nm^3$); 100 parts by mass Vinyl chloride-based resin (cyclohexanone solution 30 mass %): 46 parts by mass (degree of polymerization: 300, Mn=10000, $OSO_3K$=0.07 mmol/g and secondary OH=0.3 mmol/g are contained as polar groups).

Aluminum oxide powder: 7.5 parts by mass ($\alpha$-$Al_2O_3$, average particle diameter: 50 nm, manufactured by SUMITOMO CHEMICAL COMPANY, LIMITED, trade name: HIT 100, Mohs hardness: 9)

Carbon black: 2.0 parts by mass (average particle diameter: 70 nm, manufactured by TOKAI CARBON CO., LTD., trade name: SEAST TA)

(Second Composition)

Vinyl chloride-based resin: 1.6 parts by mass (as cyclohexanone solution 30 mass % resin)

n-Butyl stearate: 2 parts by mass

Methyl ethyl ketone: 121.3 parts by mass

Toluene: 121.3 parts by mass

Cyclohexanone: 60.7 parts by mass

Finally, 2 parts by mass of polyisocyanate (trade name: Coronate L, manufactured by Tosoh Corporation) as a curing agent and 2 parts by mass of stearic acid were added to the coating material for forming a magnetic layer prepared as described above. Note that the magnetic layer P/B ratio means a magnetic powder/adhesive (binder) ratio, and was 5.0. Hereinafter, the P/B ratio in each Example is shown in Table 1.

(Step of Preparing Coating Material for Forming Underlayer)

A coating material for forming an underlayer was prepared as follows. First, a third composition having the following formulation was kneaded with an extruder. Next, the kneaded third composition and a fourth composition having the following formulation, excluding stearic acid and butyl stearate, were added to a stirring tank equipped with a disperser, and premixing was performed. Subsequently, sand mill mixing was further performed, stearic acid and butyl stearate were added, and filter treatment was performed to prepare a coating material for forming an underlayer.

(Third Composition)

Acicular iron oxide powder: 100 parts by weight ($\alpha$-$Fe_2O_3$, average long axis length: 0.15 μm)

Vinyl chloride-based resin: 55.6 parts by mass (resin solution: resin content 30 mass %, cyclohexanone 70 mass %)

Citric acid: 5 parts by mass

Carbon black: 10 parts by mass (average particle diameter: 20 nm)

(Fourth Composition)

Polyurethane-based resin UR8200 (manufactured by TOYOBO CO., LTD.): 18.5 parts by mass Stearic acid: 2 parts by weight Butyl stearate: 2 parts by weight Methyl ethyl ketone: 75 parts by weight Toluene: 75 parts by weight Cyclohexanone: 35 parts by weight Finally, 2 parts by mass of polyisocyanate (trade name: Coronate L, manufactured by Tosoh Corporation) as a curing agent and 2 parts by mass of stearic acid were added to the coating material for forming an underlayer prepared as described above.

(Step of Preparing Coating Material for Forming Back Layer)

A coating material for forming a back layer was prepared as follows. The following raw materials were mixed in a stirring tank equipped with a disperser and subjected to filter treatment to prepare a coating material for forming a back layer.

Carbon black (manufactured by Asahi Carbon Co., Ltd., trade name: #80): 100 parts by mass
Polyester polyurethane: 100 parts by mass
(manufactured by Nippon Polyurethane Industry Co., Ltd., trade name: N-2304)
Methyl ethyl ketone: 500 parts by mass
Toluene: 400 parts by mass
Cyclohexanone: 100 parts by mass
Polyisocyanate (trade name: Coronate L, manufactured by Tosoh Corporation): 10 parts by mass (Film Forming Step)

A magnetic tape was prepared as described below using the coating materials prepared as described above.

First, as a support to be a base layer of a magnetic tape, a PEN film (base film) having an elongated shape and an average thickness of 4.0 μm was prepared. Next, the coating material for forming an underlayer was applied onto one principal plane of the PEN film and dried to form an underlayer on the one principal plane of the PEN film so that the underlayer in a final product had an average thickness of 1.05 μm. Next, the coating material for forming a magnetic layer was applied onto the underlayer and dried to form a magnetic layer on the underlayer so that the magnetic layer in a final product had an average thickness of 0.08 μm.

Subsequently, the coating material for forming a back layer was applied onto the other principal plane of the PEN film on which the underlayer and the magnetic layer were formed and dried, and thus a back layer was formed so that the back layer in a final product had an average thickness of 0.50 μm. Then, the PEN film on which the underlayer, the magnetic layer, and the back layer were formed was subjected to curing processing. Thereafter, calender processing was performed to smooth the surface of the magnetic layer.

(Cutting Step)

The magnetic tape obtained as described above was cut into a width of ½ inches (12.65 mm). Thus, a magnetic tape having an elongated shape was obtained.

The magnetic tape having a width of ½ inches was wound around a reel provided in a cartridge case to obtain a magnetic recording cartridge. A servo signal was recorded in the magnetic tape with a servo track writer. The servo signal included a row of magnetic patterns in an inverted V-shape, and the magnetic patterns were recorded in advance in two or more rows in parallel in the longitudinal direction at a known interval (hereinafter, referred to as a "known interval between magnetic pattern rows recorded in advance").

In the obtained magnetic tape, the extraction rate of stearic acid was 53%, the amount of stearic acid extracted in 5 minutes was 4.81 mg/m$^2$, the total amount of stearic acid extracted was 9.13 mg/m$^2$, the extraction rate of butyl stearate was 68%, the amount of butyl stearate extracted in 5 minutes was 13.30 mg/m$^2$, and the total amount of butyl stearate extracted was 19.42 mg/m$^2$. Furthermore, the average height ($H_2$) of the protrusions formed by α-$Al_2O_3$ was 5.3 nm, the average thickness (average total thickness) $t_T$ of the magnetic tape was 5.56 μm, the average thickness $t_m$ of the magnetic layer was 0.07 μm, the average thickness of the non-magnetic layer (underlayer) was 1.13 μm, the average thickness of the base layer was 4.0 μm, and the average thickness of the back layer was 0.36 μm. Furthermore, the amount of deposit on the magnetic head was small, and deterioration of output did not occur.

Example 2

A magnetic tape was obtained by the same method as in Example 1 except that phenylphosphonic acid was used as the organic acid. The extraction rate of stearic acid was 45%, the amount of stearic acid extracted in 5 minutes was 4.47 mg/m$^2$, the total amount of stearic acid extracted was 9.93 mg/m$^2$, the extraction rate of butyl stearate was 61%, the amount of butyl stearate extracted in 5 minutes was 12.06 mg/m$^2$, and the total amount of butyl stearate extracted was 19.80 mg/m$^2$. Furthermore, the average height ($H_2$) of the protrusions formed by α-$Al_2O_3$ was 5.4 nm. Furthermore, the amount of deposit on the magnetic head was small, and deterioration of output did not occur.

Example 3

A magnetic tape was obtained by the same method as in Example 1 except that the amount of stearic acid added was increased. The extraction rate of stearic acid was 50%, the amount of stearic acid extracted in 5 minutes was 6.15 mg/m$^2$, the total amount of stearic acid extracted was 12.32 mg/m$^2$, the extraction rate of butyl stearate was 67%, the amount of butyl stearate extracted in 5 minutes was 13.37 mg/m$^2$, and the total amount of butyl stearate extracted was 19.84 mg/m$^2$. Furthermore, the average height ($H_2$) of the protrusions formed by α-$Al_2O_3$ was 5.3 nm. Furthermore, the amount of deposit on the magnetic head was small, and deterioration of output did not occur.

Example 4

A magnetic tape was obtained by the same method as in Example 1 except that the thickness of the magnetic layer was reduced. The extraction rate of stearic acid was 59%, the amount of stearic acid extracted in 5 minutes was 5.05 mg/m$^2$, the total amount of stearic acid extracted was 8.61 mg/m$^2$, the extraction rate of butyl stearate was 69%, the amount of butyl stearate extracted in 5 minutes was 12.48 mg/m$^2$, and the total amount of butyl stearate extracted was 17.96 mg/m$^2$. Furthermore, the average height ($H_2$) of the protrusions formed by α-$Al_2O_3$ was 5.4 nm. Furthermore, the amount of deposit on the magnetic head was small, and deterioration of output did not occur.

Example 5

A magnetic tape was obtained by the same method as in Example 1 except that the amount of the curing agent in the magnetic layer was reduced. The extraction rate of stearic acid was 49%, the amount of stearic acid extracted in 5 minutes was 4.54 mg/m$^2$, the total amount of stearic acid extracted was 9.29 mg/m$^2$, the extraction rate of butyl stearate was 65%, the amount of butyl stearate extracted in 5 minutes was 12.21 mg/m$^2$, and the total amount of butyl stearate extracted was 18.86 mg/m$^2$. Furthermore, the average height ($H_2$) of the protrusions formed by α-$Al_2O_3$ was 5.4 nm. Furthermore, the amount of deposit on the magnetic head was small, and deterioration of output did not occur.

Example 6

A magnetic tape was obtained by the same method as in Example 1 except that the amount of citric acid added as a coating material for forming an underlayer was increased. The extraction rate of stearic acid was 56%, the amount of stearic acid extracted in 5 minutes was 5.25 mg/m$^2$, the total amount of stearic acid extracted was 9.32 mg/m$^2$, the extraction rate of butyl stearate was 64%, the amount of butyl stearate extracted in 5 minutes was 12.41 mg/m$^2$, and the total amount of butyl stearate extracted was 19.29

$mg/m^2$. Furthermore, the average height ($H_2$) of the protrusions formed by $\alpha$-$Al_2O_3$ was 4.8 nm. Furthermore, the amount of deposit on the magnetic head was small, and deterioration of output did not occur.

Example 7

A magnetic tape was obtained by the same method as in Example 1 except that the kind of the base film was changed to a PET film. The extraction rate of stearic acid was 51%, the amount of stearic acid extracted in 5 minutes was 4.97 $mg/m^2$, the total amount of stearic acid extracted was 9.69 $mg/m^2$, the extraction rate of butyl stearate was 66%, the amount of butyl stearate extracted in 5 minutes was 13.47 $mg/m^2$, and the total amount of butyl stearate extracted was 20.51 $mg/m^2$. Furthermore, the average height ($H_2$) of the protrusions formed by $\alpha$-$Al_2O_3$ was 4.6 nm. Furthermore, the amount of deposit on the magnetic head was small, and deterioration of output did not occur.

Example 8

A magnetic tape was obtained by the same method as in Example 1 except that the temperature of calender processing was set to a low temperature. The extraction rate of stearic acid was 53%, the amount of stearic acid extracted in 5 minutes was 5.25 $mg/m^2$, the total amount of stearic acid extracted was 9.96 $mg/m^2$, the extraction rate of butyl stearate was 72%, the amount of butyl stearate extracted in 5 minutes was 14.72 $mg/m^2$, and the total amount of butyl stearate extracted was 20.47 $mg/m^2$. Furthermore, the average height ($H_2$) of the protrusions formed by $\alpha$-$Al_2O_3$ was 6.0 nm. Furthermore, the amount of deposit on the magnetic head was small, and deterioration of output did not occur.

Example 9

A magnetic tape was obtained by the same method as in Example 1 except that the temperature of calender processing was set to a high temperature. The extraction rate of stearic acid was 51%, the amount of stearic acid extracted in 5 minutes was 4.72 $mg/m^2$, the total amount of stearic acid extracted was 9.19 $mg/m^2$, the extraction rate of butyl stearate was 71%, the amount of butyl stearate extracted in 5 minutes was 13.61 $mg/m^2$, and the total amount of butyl stearate extracted was 19.29 $mg/m^2$. Furthermore, the average height ($H_2$) of the protrusions formed by $\alpha$-$Al_2O_3$ was 5.3 nm. Furthermore, the amount of deposit on the magnetic head was small, and deterioration of output did not occur.

Example 10

A magnetic tape was obtained by the same method as in Example 1 except that the volume of the magnetic powder was 1200 $nm^3$. The extraction rate of stearic acid was 48%, the amount of stearic acid extracted in 5 minutes was 4.70 $mg/m^2$, the total amount of stearic acid extracted was 9.75 $mg/m^2$, the extraction rate of butyl stearate was 64%, the amount of butyl stearate extracted in 5 minutes was 12.99 $mg/m^2$, and the total amount of butyl stearate extracted was 20.29 $mg/m^2$. Furthermore, the average height ($H_2$) of the protrusions formed by $\alpha$-$Al_2O_3$ was 5.1 nm. Furthermore, the amount of deposit on the magnetic head was small, and deterioration of output did not occur.

Example 11

A magnetic tape was obtained by the same method as in Example 1 except that the volume of the magnetic powder was 2500 $nm^3$. The extraction rate of stearic acid was 54%, the amount of stearic acid extracted in 5 minutes was 4.85 $mg/m^2$, the total amount of stearic acid extracted was 9.06 $mg/m^2$, the extraction rate of butyl stearate was 67%, the amount of butyl stearate extracted in 5 minutes was 13.05 $mg/m^2$, and the total amount of butyl stearate extracted was 19.55 $mg/m^2$. Furthermore, the average height ($H_2$) of the protrusions formed by $\alpha$-$Al_2O_3$ was 4.7 nm. Furthermore, the amount of deposit on the magnetic head was small, and deterioration of output did not occur.

Example 12

A magnetic tape was obtained by the same method as in Example 1 except that the P/B ratio of the underlayer was changed. The extraction rate of stearic acid was 58%, the amount of stearic acid extracted in 5 minutes was 4.53 $mg/m^2$, the total amount of stearic acid extracted was 7.76 $mg/m^2$, the extraction rate of butyl stearate was 79%, the amount of butyl stearate extracted in 5 minutes was 10.81 $mg/m^2$, and the total amount of butyl stearate extracted was 13.67 $mg/m^2$. Furthermore, the average height ($H_2$) of the protrusions formed by $\alpha$-$Al_2O_3$ was 5.8 nm. Furthermore, the amount of deposit on the magnetic head was small, and deterioration of output did not occur.

Example 13

A magnetic tape was obtained by the same method as in Example 1 except that the P/B ratio of the underlayer was changed and phenylphosphonic acid was used as the organic acid. The extraction rate of stearic acid was 55%, the amount of stearic acid extracted in 5 minutes was 3.86 $mg/m^2$, the total amount of stearic acid extracted was 7.06 $mg/m^2$, the extraction rate of butyl stearate was 77%, the amount of butyl stearate extracted in 5 minutes was 11.18 $mg/m^2$, and the total amount of butyl stearate extracted was 14.48 $mg/m^2$. Furthermore, the average height ($H_2$) of the protrusions formed by $\alpha$-$Al_2O_3$ was 5.8 nm. Furthermore, the amount of deposit on the magnetic head was small, and deterioration of output did not occur.

Comparative Example 1

A magnetic tape was obtained by the same method as in Example 1 except that the amount of the organic acid added was small. The extraction rate of stearic acid was 41%, the amount of stearic acid extracted in 5 minutes was 3.49 $mg/m^2$, the total amount of stearic acid extracted was 8.48 $mg/m^2$, the extraction rate of butyl stearate was 64%, the amount of butyl stearate extracted in 5 minutes was 12.55 $mg/m^2$, and the total amount of butyl stearate extracted was 19.50 $mg/m^2$. Furthermore, the average height ($H_2$) of the protrusions formed by $\alpha$-$Al_2O_3$ was 5.3 nm. The deterioration of output was significant, and the head damage was large.

Comparative Example 2

A magnetic tape was obtained by the same method as in Comparative Example 1 except that $\alpha$-$Al_2O_3$ having a particle diameter of 80 nm (HIT-82) was used and the amount of butyl stearate was reduced. The extraction rate of stearic acid was 41%, the amount of stearic acid extracted in 5 minutes was 2.44 $mg/m^2$, the total amount of stearic acid extracted was 5.90 $mg/m^2$, the extraction rate of butyl stearate was 59%, the amount of butyl stearate extracted in 5 minutes was 6.74 mg/m$^2$, and the total amount of butyl stearate extracted was 11.35 mg/m$^2$. Furthermore, the average height ($H_2$) of the protrusions formed by $\alpha$-$Al_2O_3$ was 5.2 nm. The amount of deposit on the magnetic head was large.

Comparative Example 3

A magnetic tape was obtained by the same method as in Comparative Example 1 except that the volume of the magnetic powder was set to 2500 nm$^3$. The extraction rate of stearic acid was 38%, the amount of stearic acid extracted in 5 minutes was 2.72 mg/m$^2$, the total amount of stearic acid extracted was 7.17 mg/m$^2$, the extraction rate of butyl stearate was 51%, the amount of butyl stearate extracted in 5 minutes was 5.73 mg/m$^2$, and the total amount of butyl stearate extracted was 11.20 mg/m$^2$. Furthermore, the average height ($H_2$) of the protrusions formed by $\alpha$-$Al_2O_3$ was 5.1 nm. The deterioration of output was significant, and the head damage was large.

Comparative Example 4

A magnetic tape was obtained by the same method as in Example 1 except that the average height ($H_2$) of the protrusions formed by $\alpha$-$Al_2O_3$ was more than 7 nm and the total amount of stearic acid extracted and the amount of stearic acid extracted in 5 minutes were small. The extraction rate of stearic acid was 51%, the amount of stearic acid extracted in 5 minutes was 1.51 mg/m$^2$, the total amount of stearic acid extracted was 2.97 mg/m$^2$, the extraction rate of butyl stearate was 91%, the amount of butyl stearate extracted in 5 minutes was 23.87 mg/m$^2$, and the total amount of butyl stearate extracted was 26.29 mg/m$^2$. Furthermore, the average height ($H_2$) of the protrusions formed by $\alpha$-$Al_2O_3$ was 8.2 nm. The deterioration of output was significant, and the head damage was large.

Table 1 shows the configurations and the evaluation results of the magnetic tapes of Examples 1 to 13 and Comparative Examples 1 to 4.

TABLE 1

| | Fatty acid | | | Fatty acid ester | | | | |
|---|---|---|---|---|---|---|---|---|
| | Amount of fatty acid extracted in 5 minutes (mg/m$^2$) | Total amount of fatty acid extracted (mg/m$^2$) | Extraction rate (%) | Amount of fatty acid ester extracted in 5 minutes (mg/m$^2$) | Total amount of fatty acid ester extracted (mg/m$^2$) | Extraction rate (%) | Height of $\alpha$-$Al_2O_3$ (nm) | Thickness of magnetic layer (μm) |
| Example 1 | 4.81 | 9.13 | 53 | 13.30 | 19.42 | 68 | 5.3 | 0.07 |
| Example 2 | 4.47 | 9.93 | 45 | 12.06 | 19.80 | 61 | 5.4 | 0.08 |
| Example 3 | 6.15 | 12.32 | 50 | 13.37 | 19.84 | 67 | 5.3 | 0.07 |
| Example 4 | 5.05 | 8.61 | 59 | 12.48 | 17.96 | 69 | 5.4 | 0.06 |
| Example 5 | 4.54 | 9.29 | 49 | 12.21 | 18.86 | 65 | 5.4 | 0.07 |
| Example 6 | 5.25 | 9.32 | 56 | 12.41 | 19.29 | 64 | 4.8 | 0.07 |
| Example 7 | 4.97 | 9.69 | 51 | 13.47 | 20.51 | 66 | 4.6 | 0.08 |
| Example 8 | 5.25 | 9.96 | 53 | 14.72 | 20.47 | 72 | 6.0 | 0.07 |
| Example 9 | 4.72 | 9.19 | 51 | 13.61 | 19.29 | 71 | 5.3 | 0.07 |
| Example 10 | 4.70 | 9.75 | 48 | 12.99 | 20.29 | 64 | 5.1 | 0.07 |
| Example 11 | 4.85 | 9.06 | 54 | 13.05 | 19.55 | 67 | 4.7 | 0.07 |
| Example 12 | 4.53 | 7.76 | 58 | 10.81 | 13.67 | 79 | 5.8 | 0.07 |
| Example 13 | 3.86 | 7.06 | 55 | 11.18 | 14.48 | 77 | 5.8 | 0.07 |
| Comparative Example 1 | 3.49 | 8.48 | 41 | 12.55 | 19.50 | 64 | 5.3 | 0.08 |
| Comparative Example 2 | 2.44 | 5.90 | 41 | 6.74 | 11.35 | 59 | 5.2 | 0.08 |
| Comparative Example 3 | 2.72 | 7.17 | 38 | 5.73 | 11.20 | 51 | 5.1 | 0.08 |
| Comparative Example 4 | 1.51 | 2.97 | 51 | 23.87 | 26.29 | 91 | 8.2 | 0.05 |

| | Thickness of underlayer (μm) | Thickness of back layer (μm) | Thickness of base layer (μm) | Total thickness (μm) | P/B ratio of magnetic layer | P/B ratio of underlayer | Deposit | Deterioration of output |
|---|---|---|---|---|---|---|---|---|
| Example 1 | 1.13 | 0.36 | 4.00 | 5.56 | 5.0 | 3.5 | ○ | ○ |
| Example 2 | 1.13 | 0.40 | 4.00 | 5.61 | 5.0 | 3.5 | ○ | ○ |
| Example 3 | 1.11 | 0.48 | 4.00 | 5.66 | 5.0 | 3.5 | ○ | ⊙ |
| Example 4 | 1.10 | 0.35 | 4.00 | 5.51 | 5.0 | 3.5 | ○ | ⊙ |
| Example 5 | 1.11 | 0.50 | 4.00 | 5.68 | 5.0 | 3.5 | ○ | ○ |
| Example 6 | 1.08 | 0.50 | 4.00 | 5.65 | 5.0 | 3.5 | ○ | ⊙ |
| Example 7 | 1.12 | 0.45 | 4.00 | 5.64 | 5.0 | 3.5 | ○ | ⊙ |
| Example 8 | 1.12 | 0.46 | 4.00 | 5.65 | 5.0 | 3.5 | ○ | ⊙ |
| Example 9 | 1.15 | 0.46 | 4.00 | 5.68 | 5.0 | 3.5 | ○ | ○ |
| Example 10 | 1.07 | 0.52 | 4.00 | 5.66 | 5.0 | 3.5 | ○ | ○ |
| Example 11 | 1.06 | 0.56 | 4.00 | 5.69 | 5.0 | 3.5 | ○ | ⊙ |
| Example 12 | 0.99 | 0.48 | 4.00 | 5.54 | 5.0 | 5.0 | ○ | ⊙ |
| Example 13 | 1.00 | 0.46 | 4.00 | 5.53 | 5.0 | 5.0 | ○ | ○ |
| Comparative Example 1 | 1.07 | 0.50 | 4.00 | 5.65 | 5.0 | 3.5 | ○ | Δ |

TABLE 1-continued

| | | | | | | | | |
|---|---|---|---|---|---|---|---|---|
| Comparative Example 2 | 1.05 | 0.50 | 4.00 | 5.63 | 5.0 | 3.5 | X | ⊙ |
| Comparative Example 3 | 1.03 | 0.44 | 4.00 | 5.55 | 5.0 | 3.5 | Δ | X |
| Comparative Example 4 | 0.70 | 0.36 | 4.50 | 5.61 | 5.0 | 3.5 | ○ | X |

Note that each symbol in Table 1 means the following measured value.

$t_T$: Average thickness of magnetic tape (average total thickness) (unit: μm)

$t_m$: Average thickness of magnetic layer (unit: nm)

$t_b$: Average thickness of back layer (unit: μm)

The following can be seen from the results shown in Table 1.

In all of the magnetic tapes of Examples 1 to 13, the average height ($H_2$) of the protrusions formed by the second particles was 7 nm or less, the extraction rate of stearic acid as a fatty acid was 45% or more, the amount of deposit on the magnetic head was small, and deterioration of output did not occur.

Comparison of Example 1 with Comparative Example 1 shows that in the magnetic tape of Example 1, the average height ($H_2$) of the protrusions formed by the second particles was 7 nm or less, the extraction rate of stearic acid was 45% or more, the amount of deposit on the magnetic head was small, and deterioration of output did not occur. Meanwhile, in the magnetic tape of Comparative Example 1, the extraction rate of stearic acid was less than 45% and the degree of deterioration of output was larger than that in Example 1.

Furthermore, comparison of Comparative Example 1 with Comparative Example 2 shows that in the magnetic tape of Comparative Example 2, the extraction rate of butyl stearate was less than 50% and the amount of deposit on the magnetic head was large.

Furthermore, comparison of Comparative Example 1 with Comparative Example 3 shows that in the magnetic tape of Comparative Example 3, the extraction rate of butyl stearate was less than 60%, the amount of deposit on the magnetic head was large, and the degree of deterioration of output was large.

Furthermore, comparison of Example 1 with Comparative Example 4 shows that in the magnetic tape of Comparative Example 4, although the extraction rate of stearic acid was 45% or more, the height of the protrusions formed by alumina corresponding to the second particles was more than 7 nm and the degree of deterioration of output was large.

Although embodiments and Examples of the present technology are specifically described above, the present technology is not limited to the embodiments and Examples described above, and various modifications based on the technical idea of the present technology may be made.

For example, configurations, methods, steps, shapes, materials, numerical values, and the like described in the embodiments and Examples described above are merely examples, and different configurations, methods, steps, shapes, materials, numerical values, and the like may be used as needed. Furthermore, the chemical formulae of compounds and the like are representative and are not limited to the listed valences and the like as long as a common name of the same compound is used.

Furthermore, configurations, methods, steps, shapes, materials, numerical values, and the like of the embodiments and Examples described above can be combined with each other without departing from the gist of the present technology.

Furthermore, in the present description, a numerical value range indicated by using "to" indicates a range including numerical values described before and after "to" as the minimum value and the maximum value, respectively. In the numerical value ranges described in stages in the present description, the upper limit or the lower limit of a numerical value range of a certain stage may be replaced with the upper limit or the lower limit of a numerical value range of another stage. The materials exemplified in the present description may be used alone or in combination of two or more thereof unless otherwise specified.

REFERENCE SIGNS LIST

10 Magnetic recording medium
11 Base layer
12 Underlayer
13 Magnetic layer
14 Back layer

The invention claimed is:

1. A magnetic recording medium comprising a magnetic layer including a magnetic powder, the magnetic layer including first particles having conductivity and second particles having a Mohs hardness of 7 or more, the first particles and the second particles forming protrusions on a surface on a side of the magnetic layer, the second particles forming protrusions having an average height (H2) of 7 nm or less on the surface on the side of the magnetic layer, the magnetic recording medium including a fatty acid and a fatty acid ester, the magnetic recording medium having an extraction rate of the fatty acid of 45% or more, the extraction rate defined by a formula described below:

$$\text{extraction rate of fatty acid (\%)}=[\text{amount of fatty acid extracted in 5 minutes (mg/m}^2\text{)/total amount of fatty acid extracted (mg/m}^2\text{)}]\times 100,$$

and the magnetic recording medium having an extraction rate of the fatty acid ester of 60% or more, the extraction rate defined by a formula described below:

$$\text{extraction rate of fatty acid ester (\%)}=[\text{amount of fatty acid ester extracted in 5 minutes (mg/m}^2\text{)/total amount of fatty acid ester extracted (mg/m}^2\text{)}]\times 100.$$

2. The magnetic recording medium according to claim 1, wherein an amount of the fatty acid extracted in 5 minutes ($mg/m^2$) is 3.0 $mg/m^2$ or more.

3. The magnetic recording medium according to claim 1, wherein a total amount of the fatty acid extracted ($mg/m^2$) is 5.0 $mg/m^2$ or more.

4. The magnetic recording medium according to claim 1, wherein the fatty acid includes stearic acid.

5. The magnetic recording medium according to claim 1, wherein an amount of the fatty acid ester extracted in 5 minutes ($mg/m^2$) is 10.0 $mg/m^2$ or more.

6. The magnetic recording medium according to claim 1, wherein a total amount of the fatty acid ester extracted (mg/m2) is 12.0 $mg/m^2$ or more.

7. The magnetic recording medium according to claim 1, wherein the fatty acid ester includes butyl stearate.

8. The magnetic recording medium according to claim 1, wherein the magnetic layer has an average thickness of 0.08 μm or less.

9. The magnetic recording medium according to claim 1, further comprising a non-magnetic layer.

10. The magnetic recording medium according to claim 9, wherein the non-magnetic layer has an average thickness of 1.2 μm or less.

11. The magnetic recording medium according to claim 1, wherein the magnetic recording medium has an average thickness (average total thickness) of 5.7 μm or less.

12. The magnetic recording medium according to claim 1, wherein the magnetic powder has a surface covered with a covering agent.

13. The magnetic recording medium according to claim 12, wherein the covering agent includes an organic acid.

14. The magnetic recording medium according to claim 1, wherein the second particles include inorganic particles.

15. The magnetic recording medium according to claim 1, wherein the second particles include alumina particles.

16. A magnetic recording cartridge comprising the magnetic recording medium according to claim 1 in a state of being wound around a reel, the magnetic recording medium accommodated in a case.

* * * * *